United States Patent
Kondou

(10) Patent No.: US 10,628,056 B2
(45) Date of Patent: Apr. 21, 2020

(54) INFORMATION PROCESSING APPARATUS AND SHARED MEMORY MANAGEMENT METHOD

(71) Applicant: FUJITSU LIMITED, Kawasaki-shi, Kanagawa (JP)

(72) Inventor: Hiroshi Kondou, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 15/348,494

(22) Filed: Nov. 10, 2016

(65) Prior Publication Data
US 2017/0177254 A1   Jun. 22, 2017

(30) Foreign Application Priority Data
Dec. 18, 2015   (JP) ................. 2015-247744

(51) Int. Cl.
*G06F 3/06* (2006.01)
*G06F 11/07* (2006.01)
*G06F 12/14* (2006.01)

(52) U.S. Cl.
CPC .......... *G06F 3/0622* (2013.01); *G06F 3/0637* (2013.01); *G06F 3/0683* (2013.01); *G06F 11/079* (2013.01); *G06F 11/0724* (2013.01); *G06F 11/0727* (2013.01);
(Continued)

(58) Field of Classification Search
CPC .... G06F 3/0622; G06F 3/0637; G06F 3/0683; G06F 11/0727; G06F 11/0751; G06F 11/079
See application file for complete search history.

(56) References Cited

U.S. PATENT DOCUMENTS

| 6,510,496 B1 * | 1/2003 | Tarui .................. G06F 12/0284 709/215 |
| 2007/0283115 A1 * | 12/2007 | Freeman ............. G06F 12/1475 711/163 |

(Continued)

FOREIGN PATENT DOCUMENTS

| JP | 59-121561 | 7/1984 |
| JP | 2011-070528 | 4/2011 |
| JP | 2013-140446 | 7/2013 |

OTHER PUBLICATIONS

Japanese Office Action dated Jun. 25, 2019 for corresponding Japanese Patent Application No. 2015-247744, with English Translation, 6 pages. Please note JP-2013-140446-A and JP-59-121561-A cited herewith, were previously cited in an IDS filed on Nov. 10, 2016.*

*Primary Examiner* — Eric Cardwell
(74) *Attorney, Agent, or Firm* — Fujitsu Patent Center

(57) ABSTRACT

A permission setting register stores therein information indicating whether or not access is to be permitted to each node, per segment of a shared memory. When an abnormality occurs in a node, a permission canceling unit sets, for a segment that the abnormal node has been using, information in the permission setting register, the information corresponding to the abnormal node, to not permit access. When there is an access request from a remote node to a shared memory segment, a checking unit determines, with hardware, whether or not the access is permitted, based on the permission setting register, an access token included in the access request, and a memory token register.

9 Claims, 32 Drawing Sheets

(52) U.S. Cl.
CPC ...... *G06F 11/0751* (2013.01); *G06F 11/0793* (2013.01); *G06F 12/1441* (2013.01)

(56) References Cited

U.S. PATENT DOCUMENTS

2009/0030986 A1* 1/2009 Bates .................. G06F 3/0607
709/205
2013/0173867 A1* 7/2013 Ueki .................. G06F 12/1458
711/152

* cited by examiner

FIG.4

EXAMPLE OF MANAGEMENT TABLE FOR HOME NODE (NODE NUMBER 0)

| SEGMENT NUMBER | ADDRESS (RA) | SEGMENT SIZE | USE PERMITTED NODE NUMBER | PID OF APPLICATION IN USE | MEMORY TOKEN |
|---|---|---|---|---|---|
| 0 | 0x00000000 | 256 MB | 0, 2 | 123, 456, ··· | 0x0123 |
| 1 | 0x10000000 | 256 MB | 0, 2 | 234, 567, ··· | 0x4567 |
| 2 | 0x20000000 | 256 MB |  | 345, 678, ··· | 0x89ab |
| 3 | 0x30000000 | 256 MB | 0, 2 | 456, 789, ··· | 0xcdef |
| 4 | 0x40000000 | 256 MB |  |  |  |
| 5 | 0x50000000 | 256 MB |  |  |  |
| ··· |  |  |  |  |  |

EXAMPLE OF MANAGEMENT TABLE OF HOME NODE (NODE NUMBER 1)

| SEGMENT NUMBER | ADDRESS (RA) | SEGMENT SIZE | USE PERMITTED NODE NUMBER | PID OF APPLICATION IN USE | MEMORY TOKEN |
|---|---|---|---|---|---|
| ··· |  |  |  |  |  |
| 16 | 0x10000000 | 256 MB | 1, 2 | 135, 246, ··· | 0x321 |
| 17 | 0x11000000 | 256 MB | 1, 2 | 357, 468, ··· | 0x654 |
| 18 | 0x12000000 | 256 MB | 1, 4 | 579, 680, ··· | 0x987 |
| 19 | 0x13000000 | 256 MB |  |  |  |
| 20 | 0x14000000 | 256 MB |  |  |  |
| ··· |  |  |  |  |  |

EXAMPLE OF MANAGEMENT TABLE OF REMOTE NODE (NODE NUMBER 2)

| SEGMENT NUMBER | ADDRESS (RA) | SEGMENT SIZE | USE PERMITTED NODE NUMBER | PID OF APPLICATION IN USE | ACCESS TOKEN |
|---|---|---|---|---|---|
| 0 | 0x00000000 | 256 MB |  | 213, 546, ··· | 0x0123 |
| 1 | 0x10000000 | 256 MB |  | 324, 657, ··· | 0x4567 |
| 2 | 0x20000000 | 256 MB |  |  |  |
| 3 | 0x30000000 | 256 MB |  | 546, 849, ··· | 0xcdef |
| 4 | 0x40000000 | 256 MB |  |  |  |
| ··· |  |  |  |  |  |
| 16 | 0x100000000 | 256 MB |  | 531, 642, ··· | 0x321 |
| 17 | 0x110000000 | 256 MB |  | 753, 864, ··· | 0x654 |
| 18 | 0x120000000 | 256 MB |  |  |  |
| 19 | 0x130000000 | 256 MB |  |  |  |
| 20 | 0x140000000 | 256 MB |  |  |  |
| ··· |  |  |  |  |  |

FIG.7

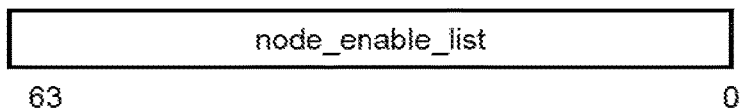

63　　　　　　　　　　　　　　　　　　　　　　　　　　　　　　　　0

| BIT | FIELD | ACCESS | DESCRIPTION |
|---|---|---|---|
| 63:0 | node_enable_list | RW | Node Enable List[63:0]<br>INITIAL VALUE IS 0x0<br>(INACCESSIBLE) |

■WHEN node_enable_list[n] = 0, PROHIBIT ACCESS FROM NODE #n TO CORRESPONDING SHARED MEMORY SEGMENT. IF THERE IS ACCESS, TRAP OF ACCESS EXCEPTION OCCURS.
■WHEN node_enable_list[n] = 1, WHETHER OR NOT ACCESS FROM NODE #n IS PERMITTED IS EXAMINED ACCORDING TO SETTING OF TOKEN FOR SEGMENT CORRESPONDING TO THIS REGISTER.

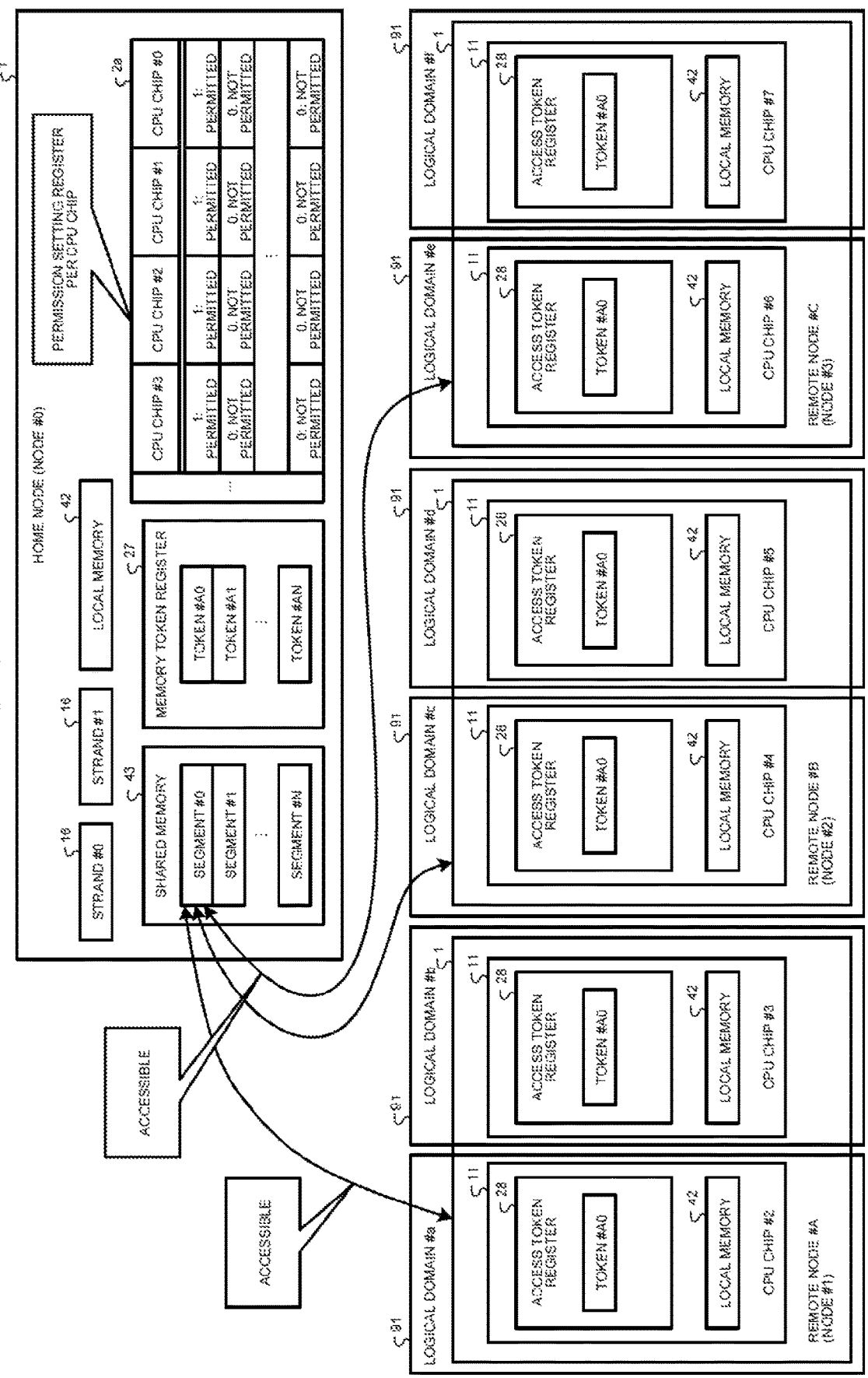

FIG.9

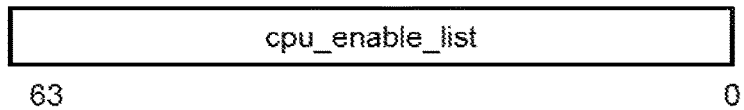

63　　　　　　　　　　　　　　　　　　　　　　　　　　　0

| BIT | FIELD | ACCESS | DESCRIPTION |
|---|---|---|---|
| 63:0 | cpu_enable_list | RW | CPU Enable List[63:0]<br>INITIAL VALUE IS 0x0<br>(INACCESSIBLE) |

■WHEN cpu_enable_list[n] = 0, PROHIBIT ACCESS FROM CPU #n TO CORRESPONDING SHARED MEMORY SEGMENT. IF THERE IS ACCESS, TRAP OF ACCESS EXCEPTION OCCURS.
■WHEN cpu_enable_list[n] = 1, WHETHER OR NOT ACCESS FROM CPU #n IS PERMITTED IS EXAMINED ACCORDING TO SETTING OF TOKEN FOR SEGMENT CORRESPONDING TO THIS REGISTER

FIG.11

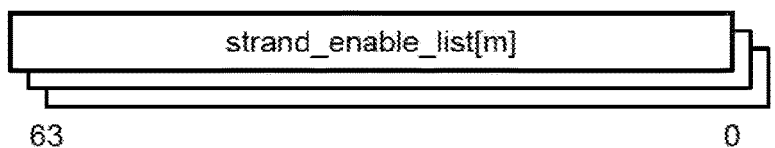

| BIT | FIELD | ACCESS | DESCRIPTION |
|---|---|---|---|
| 63:0 | strand_enable_list | RW | Strand Enable List[m][63:0] INITIAL VALUE IS 0x0 (INACCESSIBLE) |

■WHEN strand_enable_list[m][n] = 0, PROHIBIT ACCESS FROM STRAND #(64 × m + n) TO CORRESPONDING SHARED MEMORY SEGMENT. IF THERE IS ACCESS, TRAP OF ACCESS EXCEPTION OCCURS.
■WHEN strand_enable_list[m][n] = 1, WHETHER OR NOT ACCESS FROM STRAND #(64 × m + n) IS PERMITTED IS EXAMINED ACCORDING TO SETTING OF TOKEN FOR SEGMENT CORRESPONDING TO THIS REGISTER

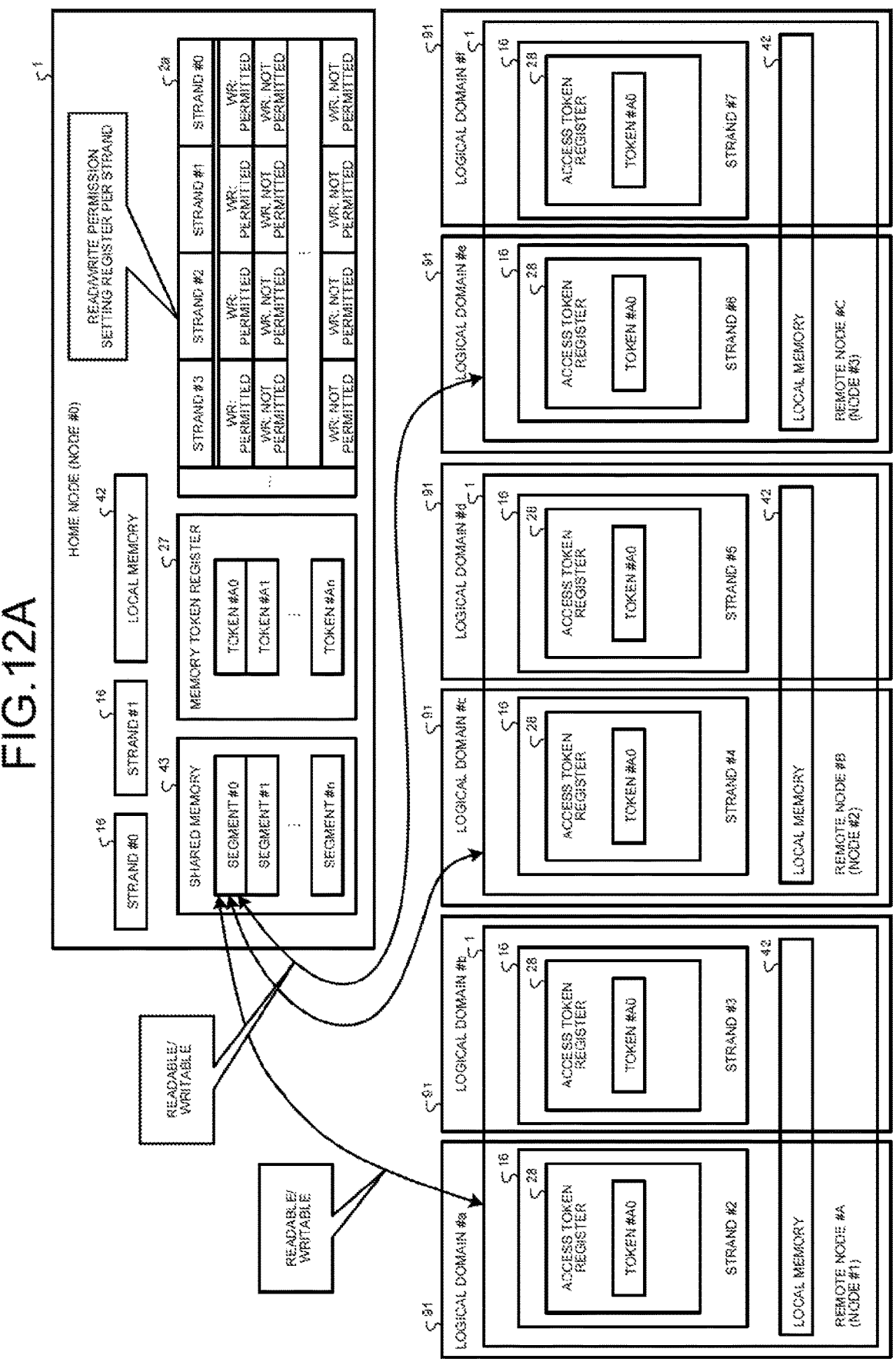

FIG.13A

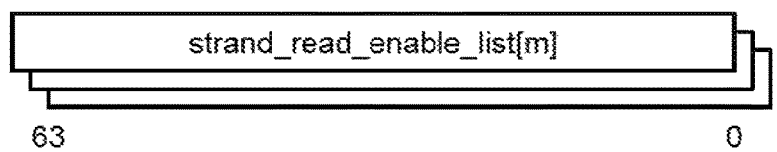

| BIT | FIELD | ACCESS | DESCRIPTION |
|---|---|---|---|
| 63:0 | strand_read_enable_list | R | Strand Read Enable List[m][63:0] INITIAL VALUE IS 0x0 (INACCESSIBLE) |

■WHEN strand_read_enable_list[m][n] = 0, PROHIBIT READ ACCESS FROM STRAND #(64 × m + n) TO CORRESPONDING SHARED MEMORY SEGMENT. IF THERE IS READ ACCESS, TRAP OF ACCESS EXCEPTION OCCURS.
■WHEN strand_read_enable_list[m][n] = 1, WHETHER OR NOT READ ACCESS FROM STRAND #(64 × m + n) IS PERMITTED IS EXAMINED ACCORDING TO SETTING OF TOKEN FOR SEGMENT CORRESPONDING TO THIS REGISTER

FIG.13B

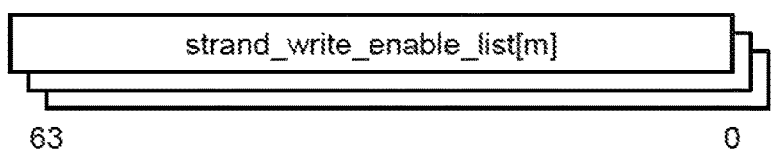

| BIT | FIELD | ACCESS | DESCRIPTION |
|---|---|---|---|
| 63:0 | strand_write_enable_list | W | Strand Write Enable List[m][63:0] INITIAL VALUE IS 0x0 (INACCESSIBLE) |

■WHEN strand_write_enable_list[m][n] = 0, PROHIBIT WRITE ACCESS FROM STRAND #(64 × m + n) TO CORRESPONDING SHARED MEMORY SEGMENT. IF THERE IS WRITE ACCESS, TRAP OF ACCESS EXCEPTION OCCURS.
■WHEN strand_write_enable_list[m][n] = 1, WHETHER OR NOT WRITE ACCESS FROM STRAND #(64 × m + n) IS PERMITTED IS EXAMINED ACCORDING TO SETTING OF TOKEN FOR SEGMENT CORRESPONDING TO THIS REGISTER

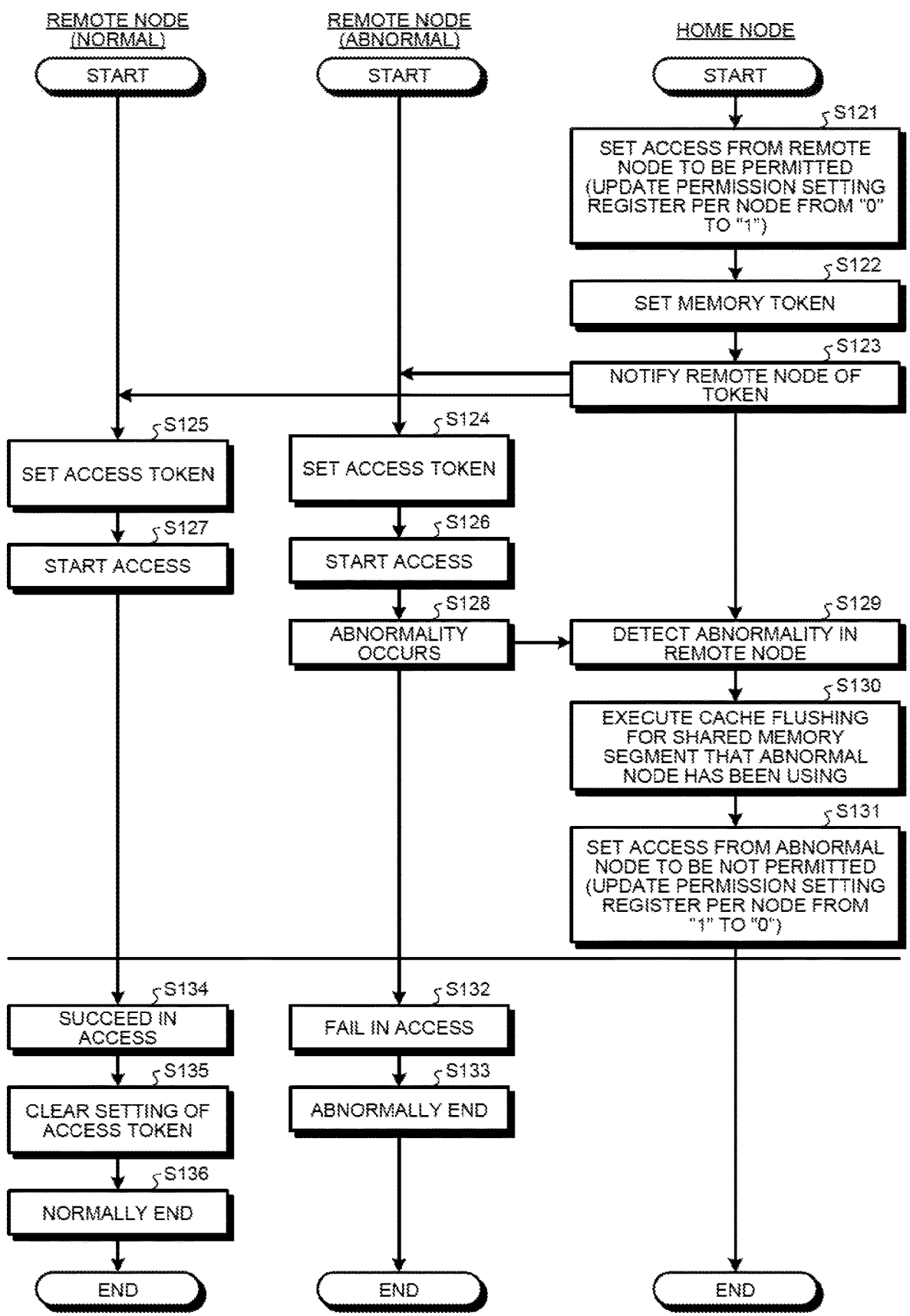

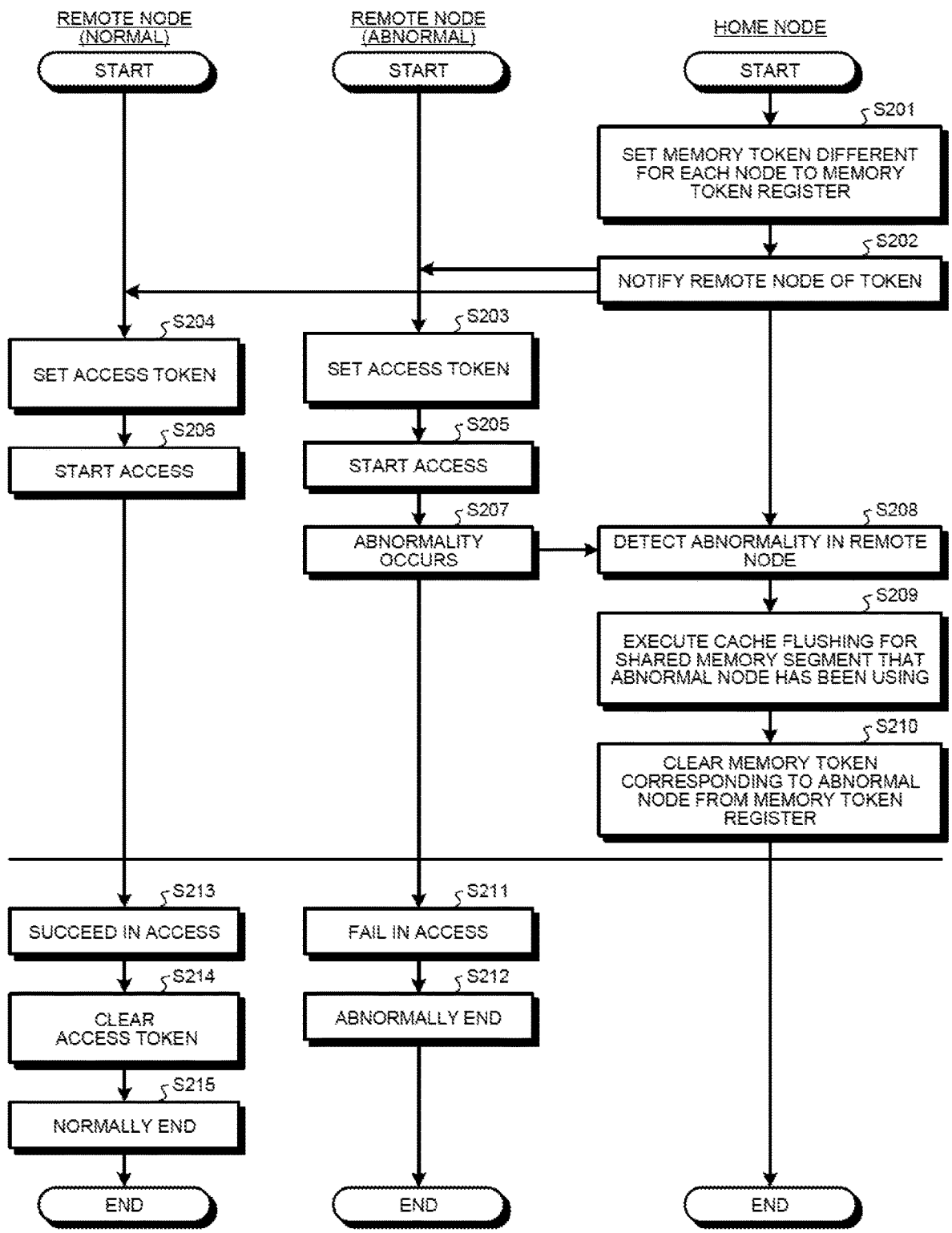

INFORMATION PROCESSING APPARATUS AND SHARED MEMORY MANAGEMENT METHOD

CROSS-REFERENCE TO RELATED APPLICATION(S)

This application is based upon and claims the benefit of priority of the prior Japanese Patent Application No. 2015-247744, filed on Dec. 18, 2015, the entire contents of which are incorporated herein by reference.

FIELD

The embodiments discussed herein are related to an information processing apparatus and a shared memory management method.

BACKGROUND

In recent years, information processing systems, each of which has plural information processing apparatuses connected via a crossbar switch or the like, have been used. Each of the information processing apparatuses has plural central processing units (CPU), a memory, a hard disk drive (HDD), and the like, and performs communication with the other information processing apparatuses via the crossbar switch or the like. Memories that each of the information processing apparatuses has include: a local memory that only that particular information processing apparatus is able to access; and a shared memory that the other information processing apparatuses are able to access.

For the shared memory, a technique using access tokens has been developed as a technique for controlling permission for access from the other information processing apparatuses. Each of the information processing apparatuses stores, in a register, a key called a memory token for each unit area having a predetermined size in the shared memory, and permits only any information processing apparatus, which has specified the key as an access token, to access the corresponding unit area. If a failure occurs in any of the other information processing apparatuses using the shared memory, the information processing apparatus having the shared memory stores a new memory token into the register. The information processing apparatus having the shared memory then transmits the new memory token to that other information processing apparatus, in which the failure has occurred. However, because the information processing apparatus, in which the failure has occurred, is unable to receive the new memory token, even if the information processing apparatus attempts to access the shared memory, the memory tokens do not match. Therefore, access to the shared memory from the information processing apparatus, in which the failure has occurred, is able to be prevented.

Further, there is a technique for preventing, with a parallel processing program, a malfunction due to memory destruction, by referring to a page table including identifiers of processor elements that have been permitted to access a physical memory and determining whether or not the physical memory is accessible by a processor element.

Furthermore, there is a technique for realizing access protection of a shared memory, by determining access violation, based on bit patterns indicating possibility and prohibition of read and write, when a processor accesses the shared memory.

[Patent Literature 1] Japanese Laid-open Patent Publication No. 2013-140446
[Patent Literature 2] Japanese Laid-open Patent Publication No. 2011-70528
[Patent Literature 3] Japanese Laid-open Patent Publication No. S59-121561

However, when a failure occurs in a certain information processing apparatus that uses a shared memory, in order to reset the access token, access to the whole shared memory is temporarily stopped. Therefore, there is a problem that even if the other normal information processing apparatuses excluding that information processing apparatus, in which the failure has occurred, wish to access the shared memory, the access is interrupted due to the process of stopping and restarting the access to the whole shared memory.

SUMMARY

According to an aspect of an embodiment, an information processing apparatus, which forms, together with other plural information processing apparatuses, an information processing system, and has a shared memory accessed by the other plural information processing apparatuses, includes an authentication information storage region that stores therein, for each unit area of the shared memory, authentication information that is used in access authentication control; a possibility information storage region that stores therein, for each unit area of the shared memory, possibility information used in control of accessibility from each information processing apparatus or each processing device included in each information processing apparatus; a setting processor that sets, when an abnormality occurs in an abnormal information processing apparatus, which is any one of the other plural information processing apparatuses, for a unit area of the shared memory, the unit area that the abnormal information processing apparatus has been using, the possibility information corresponding to the abnormal information processing apparatus or the processing device included in the abnormal information processing apparatus to "impossible"; and a determining processor that: determines, on the basis of the possibility information stored in the possibility information storage region, when any of the other plural information processing apparatuses or a processing device included in any of the other plural information processing apparatuses attempts to access any of the unit areas of the shared memory via an access request including authentication information, whether or not access to each of the unit areas requested to be accessed is possible; when the access from that other information processing apparatus or the processing device included in that other information processing apparatus is impossible, denies the access to the unit area being a target of the determination; and when the access from that other information processing apparatus or the processing device included in that other information processing apparatus is possible, determines whether or not to permit the access to the unit area being the target of the determination, on the basis of a result of comparing the authentication information included in the access request with the authentication information stored in the authentication information storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a management table;

FIG. 7 is a diagram illustrating a permission setting register per node;

FIG. 8A is a first diagram for explanation of access permission for each CPU chip;

FIG. 9 is a diagram illustrating a permission setting register per CPU chip;

FIG. 11 is a diagram illustrating a permission setting register per strand;

FIG. 12A is a first diagram for explanation of read/write permission for each strand;

FIG. 13A is a diagram illustrating a read permission setting register per strand;

FIG. 13B is a diagram illustrating a write permission setting register per strand;

FIG. 17 is a flowchart illustrating a flow of a process upon occurrence of an abnormality in a node (when whether or not accessible is settable for each node);

FIG. 22 is a flowchart illustrating a flow of a process upon occurrence of an abnormality in a node.

DESCRIPTION OF EMBODIMENTS

Preferred embodiments of the present invention will be explained with reference to accompanying drawings. The embodiments do not limit the disclosed techniques.

[a] First Embodiment

First of all, terms used in the description of a first embodiment will be described.

"Node" denotes an information processing apparatus (a computer system), on which one or more operating systems (OS) run. In a computer system having a virtualization function, a node may be logically divided into plural logical domains to allow plural OSs to run on the node.

"Shared memory accessed by nodes" denotes a shared memory that is accessible (readable/writable) by plural nodes (plural applications that run on plural different OSs).

"Home node" denotes a node having a physical memory established as a memory area shared by nodes.

"Remote node" denotes a node that refers to or updates the memory of the home node.

"Segment" denotes a unit in which the shared memory is managed. A memory token, which will be described later, may be set for each segment.

"Segment size" denotes a size of the unit in which the shared memory is managed. For example, the size may be 4 megabytes (MB), 32 MB, 256 MB, or 2 gigabytes (GB).

"RA" denotes a real address. The real address is an address assigned to each logical domain in a system, in which a virtualization function is installed.

"PA" denotes a physical address. The physical address is an address assigned according to the physical position.

"Memory token" denotes a memory access key that is set in a memory token register of a CPU chip of the home node. A different memory token is set for each segment. The memory access key is also referred to as a token.

"Access token" denotes a memory access key that is set when a remote node accesses the shared memory of the home node (another one of the nodes).

Based on an access token added to a memory access request from a remote node and a memory token set in the memory token register of the home node, hardware controls whether or not the memory access request is executable.

When the memory token of the home node and the access token of the remote node match, the shared memory is accessible (readable and writable).

When the memory token of the home node and the access token of the remote node do not match and access (read and write) to the shared memory is attempted, an exception trap occurs and the shared memory becomes inaccessible.

Figure 1:
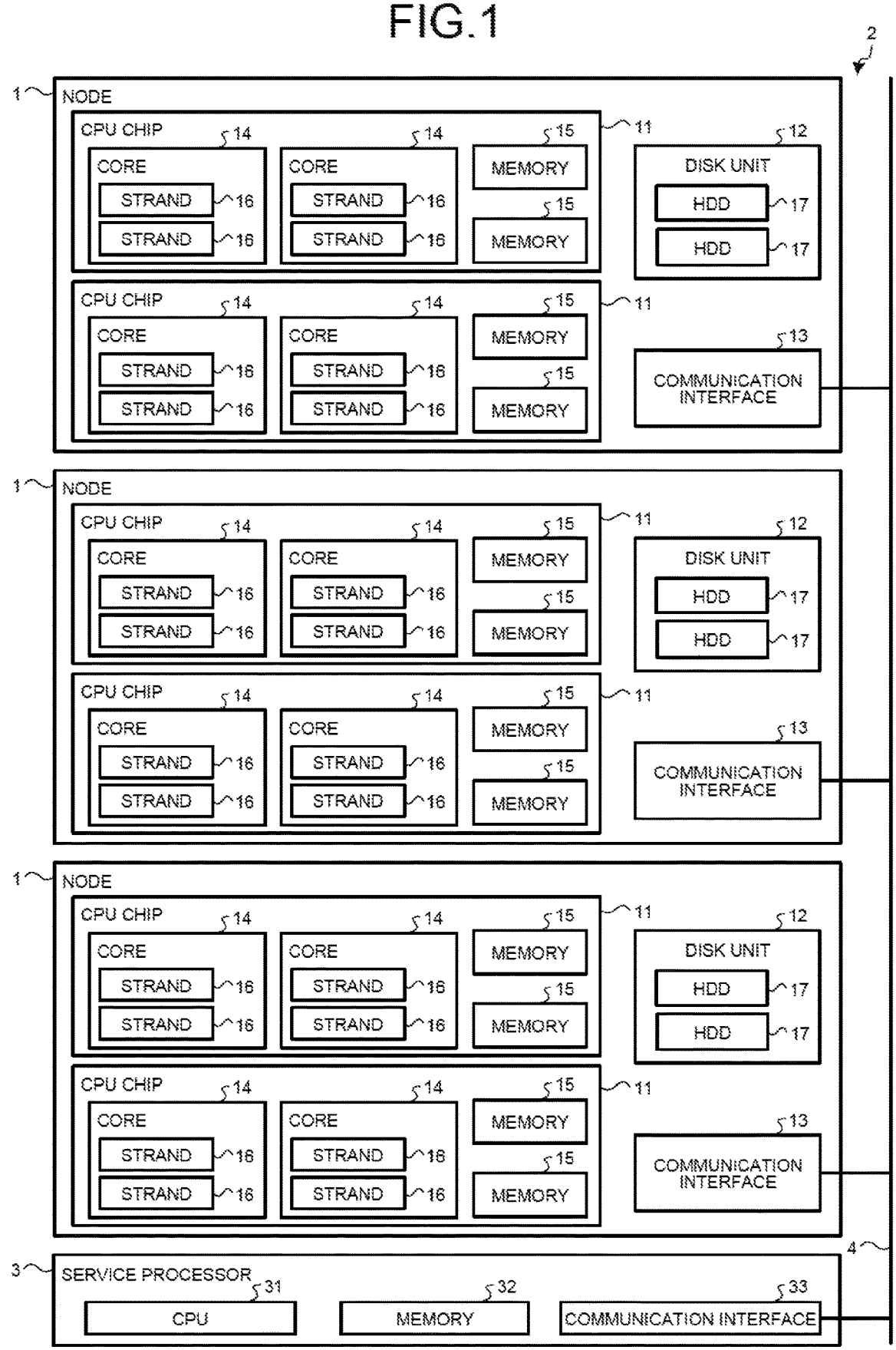
FIG. 1 is a diagram illustrating a hardware configuration of an information processing system according to a first embodiment.

Next, a hardware configuration of an information processing system according to the embodiments will be described. FIG. 1 is a diagram illustrating the hardware configuration of the information processing system according to the embodiments. As illustrated in FIG. 1, an information processing system 2 has three nodes 1 and a service processor 3. Further, the three nodes 1 and the service processor 3 are connected to one another via a crossbar network 4.

The node 1 is an information processing apparatus having two CPU chips 11, a disk unit 12, and a communication interface 13. The CPU chip 11 is a chip having two cores 14 and two memories 15. The core 14 is a processing unit having two strands 16. The strand 16 is a unit in which the core 14 executes an instruction. A program is executed by each of the strands 16. The memory 15 is a random access memory (RAM) storing therein the program executed by the core 14 and data used by the core 14.

The disk unit 12 is a storage device having two HDDs 17. The HDD 17 is a magnetic disk device. The communication interface 13 is an interface for communicating with the other nodes 1 and the service processor 3, via the crossbar network 4.

The service processor 3 is an apparatus that controls the nodes 1, and has a CPU 31, a memory 32, and a communication interface 33. The CPU 31 is a central processing unit that executes a program stored in the memory 32. The memory 32 is a RAM storing therein the program executed by the CPU 31 and data and the like used by the CPU 31. The communication interface 33 is an interface for communicating with the nodes 1 via the crossbar network 4.

For convenience of explanation, three nodes 1 are illustrated in FIG. 1, but the information processing system 2 may have any number of nodes 1. Further, FIG. 1 illustrates a case where the node 1 has two CPU chips 11, but the node 1 may have any number of CPU chips 11. Furthermore, FIG. 1 illustrates a case where the CPU chip 11 has two cores 14, but the CPU chip 11 may have any number of cores 14. Moreover, FIG. 1 illustrates a case where the core 14 has two strands 16, but the core 14 may include any number of strands 16. In addition, FIG. 1 illustrates a case where the CPU chip 11 has two memories 15, but the CPU chip 11 may have any number of memories 15. What is more, FIG. 1 illustrates a case where the disk unit 12 has two HDDs 17, but the disk unit 12 may have any number of HDDs 17.

Figure 2:
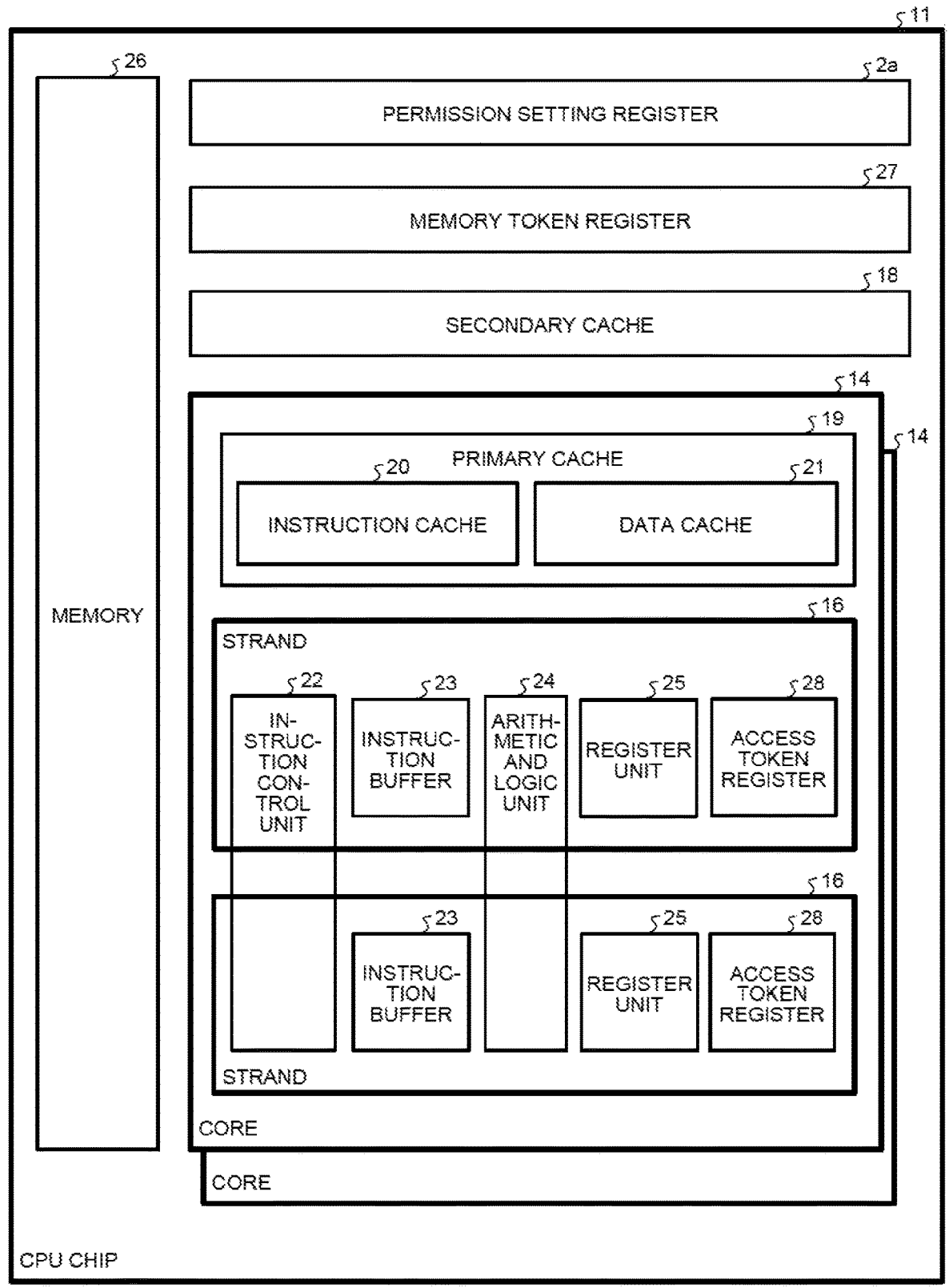
FIG. 2 is a block diagram of a CPU chip.

FIG. 2 is a block diagram of the CPU chip 11. As illustrated in FIG. 2, the CPU chip 11 has two cores 14, a memory 26, a memory token register 27, a secondary cache 18, and a permission setting register 2a. The memory 26 corresponds to the two memories 15 in FIG. 1. The memory token register 27, the secondary cache 18, and the permission setting register 2a are omitted in FIG. 1.

The memory token register 27 stores therein a memory token for each segment. The secondary cache 18 is a cache device having a cache memory with a lower speed and a larger capacity than those of a primary cache 19 in the core 14.

The permission setting register 2a stores therein, per segment, information indicating whether or not access is to be permitted to each of the nodes 1. The permission setting register 2a stores therein, per segment, information permitting access, when there is no node 1 or application, in which an abnormality has occurred. The permission setting register 2a stores therein information prohibiting access from an abnormal node, for a segment that the abnormal node has been using, when an abnormality occurs in that node 1. The permission setting register 2a stores therein information prohibiting access from the node 1, on which an abnormal application is running, for a segment that the abnormal application has been using, when an abnormality occurs in that application.

The permission setting register 2a may store therein information indicating whether or not access is to be permitted, for each of the CPU chips 11, each of the cores 14, or each of the strands 16, instead of for each of the nodes 1. Further, the permission setting register 2a may store therein information indicating whether or not each of read access and write access is to be permitted, as the information indicating whether or not access is to be permitted.

The core 14 has the primary cache 19 and the two strands 16. The primary cache 19 is a cache device having a cache memory with a higher speed and a smaller capacity than those of the secondary cache 18. The primary cache 19 has an instruction cache 20 and a data cache 21. The instruction cache 20 stores therein instructions, and the data cache 21 stores therein data.

The strand 16 reads out the instructions and the data from the primary cache 19. When an instruction or data to be read out by the strand 16 is not in the primary cache 19, the primary cache 19 reads out the instruction or data from the secondary cache 18. When an instruction or data to be read out by the primary cache 19 is not in the secondary cache 18, the secondary cache 18 reads the instruction or the data from the memory 26.

Further, the strand 16 writes, into the primary cache 19, data to be stored in the memory 26. The data written by the strand 16 into the primary cache 19 is then written into the secondary cache 18 and then written into the memory 26 from the secondary cache 18.

The strand 16 has an instruction control unit 22, an instruction buffer 23, an arithmetic and logic unit 24, a register unit 25, and an access token register 28. The instruction control unit 22 reads out an instruction from the instruction buffer 23, and controls execution of the instruction read out. The instruction buffer 23 stores therein the instruction read out from the instruction cache 20. The arithmetic and logic unit 24 performs calculations such as the four basic arithmetic operations. The register unit 25 stores therein data used to execute the instruction, results of the execution of the instruction, and the like. While the strand 16 includes its own instruction buffer 23 and register unit 25, the instruction control unit 22 and the arithmetic and logic unit 24 are shared by the two strands 16.

The access token register 28 stores therein an access token for each segment of the shared memory of another one of the nodes 1. A process executed by the strand 16 accesses the shared memory by using the access tokens stored in the access token register 28. The primary cache 19 and the access token register 28 are omitted in FIG. 1. Further, the access token registers 28 are included in the strands 16 in FIG. 2, but implementation of the access token registers 28 is not limited to the example in FIG. 2, and the respective access token registers 28 corresponding to the respective strands 16 may be outside the strands 16.

Figure 3:
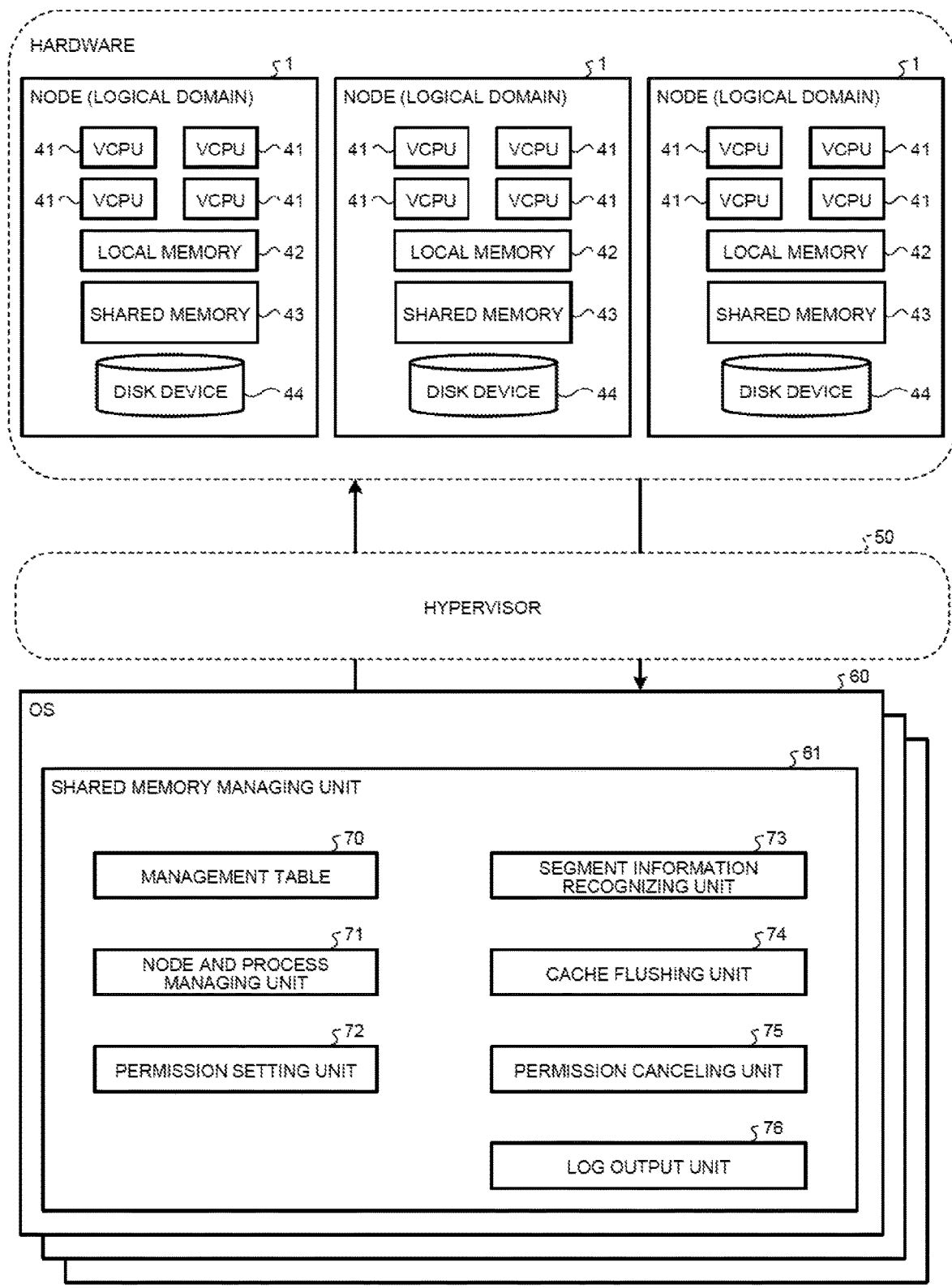
FIG. 3 is a diagram illustrating a logical hardware configuration and a software functional configuration, of the information processing system according to the first embodiment.

Next, a logical hardware configuration and a software functional configuration, of the information processing system 2 according to the first embodiment will be described. The logical hardware configuration means logical hardware that the OSs and applications use. FIG. 3 is a diagram illustrating the logical hardware configuration and the software functional configuration, of the information processing system 2 according to the first embodiment. FIG. 3 illustrates a case where each of the nodes 1 is used as one logical domain. One OS runs in one logical domain. Accordingly, in FIG. 3, one OS runs on each of the nodes 1.

As illustrated in FIG. 3, the node 1 has logical resources, which are four VCPUs 41, a local memory 42, a shared memory 43, and a disk device 44. The VCPU 41 is a logical CPU, and is associated with any one of the eight strands 16 illustrated in FIG. 1.

The local memory 42 is a memory accessed only by its own node 1, and the shared memory 43 is a memory also accessible from the other nodes 1. The local memory 42 and the shared memory 43 correspond to the four memories 15 illustrated in FIG. 1. Two of the memories 15 may be associated with the local memory 42 and the other two memories 15 may be associated with the shared memory 43, or three of the memories 15 may be associated with the local memory 42 and the other one memory 15 may be associated with the shared memory 43. The disk device 44 corresponds to the disk unit 12 illustrated in FIG. 1.

A hypervisor 50 is basic software that manages the physical resources of the information processing system 2 and provides logical resources to an OS 60. The OS 60 uses the logical resources to control execution of an application. The OS 60 has a shared memory managing unit 61.

The shared memory managing unit 61 manages the shared memory 43, and has: a management table 70; a node and process managing unit 71; a permission setting unit 72; a segment information recognizing unit 73; a cache flushing unit 74; a permission canceling unit 75; and a log output unit 76.

The management table 70 is a table, in which information on the shared memories 43 is recorded for each segment, for all of the shared memories that the information processing system 2 has, including the shared memories 43 that the other nodes 1 have.

FIG. 4 is a diagram illustrating an example of the management table 70. FIG. 4 illustrates: the management table 70 that a home node with a node number, "0", has; the management table 70 that a home node with a node number, "1", has; and the management table 70 that a remote node with a node number, "2", has. In FIG. 4, segments with segment numbers, "0" to "5", are segments, for which the home node with the node number, "0", has a physical memory. Further, segments with segment numbers, "16" to "20", are segments, for which the home node with the node number, "1", has a physical memory.

As illustrated in FIG. 4, in the management tables 70 of the home nodes with the node numbers, "0" and "1", for each segment: a segment number; an address; a segment size; use permitted node numbers; PIDs of applications in use; and a memory token, are recorded. Further, in the management table 70 of the remote node with the node number, "2", almost the same items as those of the management tables 70 of the home nodes are recorded, but access tokens are recorded instead of memory tokens.

The segment number is an identification number that identifies a segment. The address is the RA of the segment. The address may be the PA. The segment size is the size of the segment. The use permitted node number is used only in the management tables 70 of the home nodes and is a number or numbers of any of the nodes 1 permitted to use the segment.

The PID of an application in use is a process ID of an application using the segment in its own node. The memory token is a memory access key used in control of access permission for the segment. The access token is a memory access key used to access the shared memory 43 of the home node.

For example, according to the management table 70 of the home node with the node number, "0", for the segment with the identification number, "0", the RA is hexadecimally "00000000", the size is "256 MB", and the numbers of nodes permitted to use the segment are "0" and "2". Further, the segment with the identification number, "0", is used in processes with the process IDs, "123", "456", etc., in the home node, and the memory access key for the segment is hexadecimally "0123".

Further, according to the management table 70 of the remote node with the node number "2", for the segment with the identification number, "0", the RA is hexadecimally "00000000 and the size is "256 MB". Furthermore, no use permitted node number is used for the segment with the identification number, "0", because the segment is not of the shared memory 43, for which that remote node has a physical memory. Moreover, the segment with the identification number, "0", is used by processes with the process IDs, "213, "546", etc., in that remote node, and the memory access key of the segment is hexadecimally "0123". In addition, because the segment with the identification number, "2", is not permitted to be used, there is no process ID of an application using the segment.

Referring to FIG. 3 again, for each segment of the shared memory 43, the node and process managing unit 71 manages which of the nodes 1 is using the segment and which process is using the segment. Specifically, when a permission to use the shared memory 43 is given to a remote node, the node and process managing unit 71 of the home node records, into the management table 70, the node number of the remote node that uses that shared memory segment. Being the shared memory 43, there may be more than one remote node that uses the shared memory 43, and thus the node and process managing unit 71 records all of the node numbers every time a permission to use the shared memory 43 is given.

Further, when the shared memory 43 is attached to applications, the node and process managing unit 71 of each of the nodes 1 records, into the management table 70, the process IDs of the applications that use that shared memory 43. Being the shared memory 43, there may be more than one application that uses the shared memory 43, and thus the node and process managing unit 71 records all of the process IDs every time the shared memory 43 is attached to the applications.

Further, when a remote node notifies that use of the shared memory 43 has ended or when a remote node stops, the node and process managing unit 71 of the home node deletes the record of the node number of that remote node from the management table 70. Furthermore, when an application notifies that use of the shared memory has ended or when an application ends, the node and process managing unit 71 of each of the nodes 1 deletes the record of the process ID of that application from the management table 70.

When the permission setting unit 72 permits a remote node to use each segment of the shared memory 43, for the permitted remote node, the permission setting unit 72 changes the setting of the permission setting register 2a to "permitted". If the permission setting register 2a stores therein whether or not each of the CPU chips 11 is permitted to access, for the CPU chip 11 included in the permitted remote node, the permission setting unit 72 changes the setting of the permission setting register 2a to "permitted". If the permission setting register 2a stores therein whether or not each of the cores 14 is permitted to access, for the core 14 included in the permitted remote node, the permission setting unit 72 changes the setting of the permission setting register 2a to "permitted". If the permission setting register 2a stores therein whether or not each of the strands 16 is permitted to access, for the strand 16 included in the permitted remote node, the permission setting unit 72 changes the setting of the permission setting register 2a to "permitted".

If an abnormality is detected in a remote node; by using the management table 70, the segment information recognizing unit 73 identifies a segment, for which its own node has a physical memory, from segments that the abnormal node has been using. Further, if an abnormality is detected in an application running on a remote node; by using the management table 70, the segment information recognizing unit 73 identifies a segment, for which its own node has a physical memory, from segments that the abnormal application has been using.

The cache flushing unit 74 executes cache flushing per segment immediately before the later described permission canceling unit 75 changes the permission setting register 2a. That is, the cache flushing unit 74 writes back the latest data cached in the primary cache 19 or secondary cache 18 into the shared memory 43. If an abnormal node is detected, the cache flushing unit 74 executes cache flushing for a segment that the abnormal node has been using. If an abnormal application is detected, the cache flushing unit 74 executes cache flushing for a segment that the abnormal application has been using. By the cache flushing unit 74 executing the cache flushing per segment immediately before the change in the permission setting register 2a, access from the abnormal node or abnormal application is able to be blocked with the cache coherency being maintained.

If an abnormality is detected in a remote node, the permission canceling unit 75 changes the permission setting register 2a such that access from the abnormal node to a segment recognized by the segment information recognizing unit 73 is not permitted. If the permission setting register 2a stores therein whether or not each of the CPU chips 11 is permitted to access, the permission canceling unit 75 changes the permission setting register 2a such that access from the CPU chip 11 included in the abnormal node is not permitted. If the permission setting register 2a stores therein whether or not each of the cores 14 is permitted to access, the permission canceling unit 75 changes the permission setting register 2a such that access from the core 14 included in the abnormal node is not permitted. If the permission setting register 2a stores therein whether or not each of the strands 16 is permitted to access, the permission canceling unit 75 changes the permission setting register 2a such that access from the strand 16 included in the abnormal node is not permitted.

If an abnormality is detected in an application running on a remote node, the permission canceling unit 75 changes the permission setting register 2a such that access from the node, on which the abnormal application is running, to a segment recognized by the segment information recognizing unit 73, is not permitted. If the permission setting register 2a stores therein whether or not each of the CPU chips 11 is permitted to access, the permission canceling unit 75 changes the permission setting register 2a such that access from the CPU chip 11 included in the node, on which the abnormal application is running, is not permitted. If the permission setting register 2a stores therein whether or not each of the cores 14 is permitted to access, the permission canceling unit 75 changes the permission setting register 2a such that access from the core 14 included in the node, on which the abnormal application is running, is not permitted. If the permission setting register 2a stores therein whether or not each of the strands 16 is permitted to access, the permission canceling unit 75 changes the permission setting register 2a such that access from the strand 16 included in the node, on which the abnormal application is running, is not permitted.

If the permission setting register 2a stores therein whether or not each of read access and write access is to be permitted, the log output unit 76 reads data from a shared memory segment, for which write access has not been permitted, and outputs a log to the disk device 44. The log is output when write access from an abnormal node is not permitted and the process ends abnormally.

Figure 5:
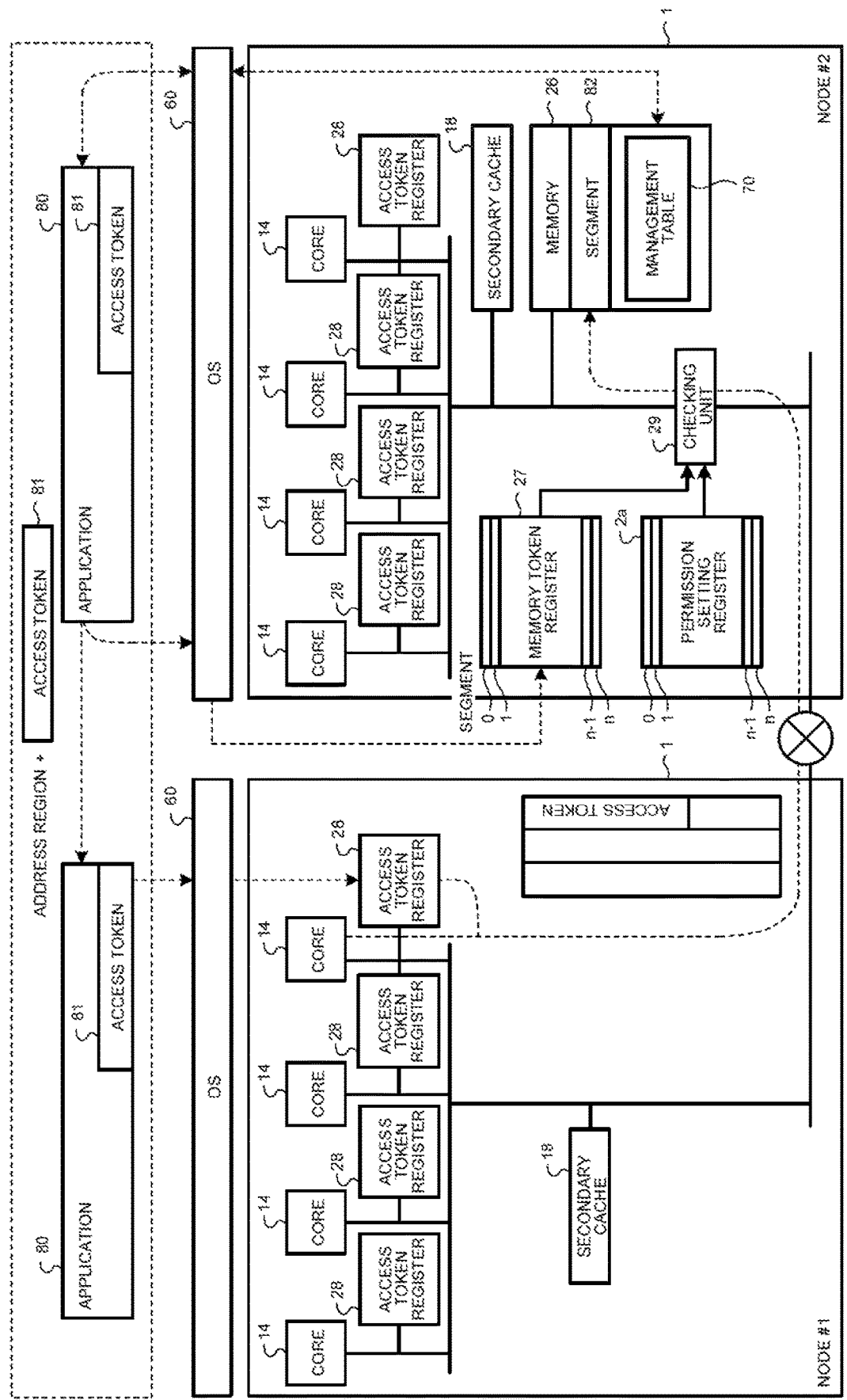
FIG. 5 is a diagram for explanation of an access permission register scheme.

Next, an access permission register scheme for controlling access to the shared memory 43 by use of the permission setting register 2a will be described, with reference to FIG. 5 to FIG. 13B. FIG. 5 is a diagram for explanation of the access permission register scheme. FIG. 5 illustrates a case where a node #1 accesses a segment 82 included in the shared memory 43 of a node #2. In FIG. 5, the core 14 has one strand 16, and the access token register 28 is associated with the core 14. As illustrated in FIG. 5, the OS 60 of the node #2 records, into the management table 70, the token, which has been set in the memory token register 27 correspondingly with the segment 82, correspondingly with the segment number, and transmits the token to an application 80 running on the node #2.

The application 80 running on the node #2 transmits, to an application 80, which runs on the node #1 and accesses the segment 82, an access token 81, which is the token transmitted from the OS 60, together with information on the address region (address and size). The application 80 running on the node #1 transmits the received access token 81 to the OS 60 running on the node #1. The OS 60 running on the node #1 stores the access token 81 into the access token register 28.

The core 14 of the node #1 transmits information including the access token 81 to the node #2 when the core 14 accesses the segment 82. A checking unit 29 of the node #2 determines whether or not the setting of the permission setting register 2a corresponding to the access to the segment 82 from the node #1 permits the access and if the access is permitted, the checking unit 29 compares the memory token corresponding to the segment 82 with the access token 81 to determine whether or not they match. If they match, the checking unit 29 of the node #2 permits the access to the segment 82. On the contrary, if the setting of the permission setting register 2a corresponding to the access to the segment 82 from the node #1 does not permit the access, or if the memory token corresponding to the segment 82 does not match the access token, the checking unit 29 of the node #2 determines that the access is denied and the access to the segment 82 is not permitted.

Figure 6A:
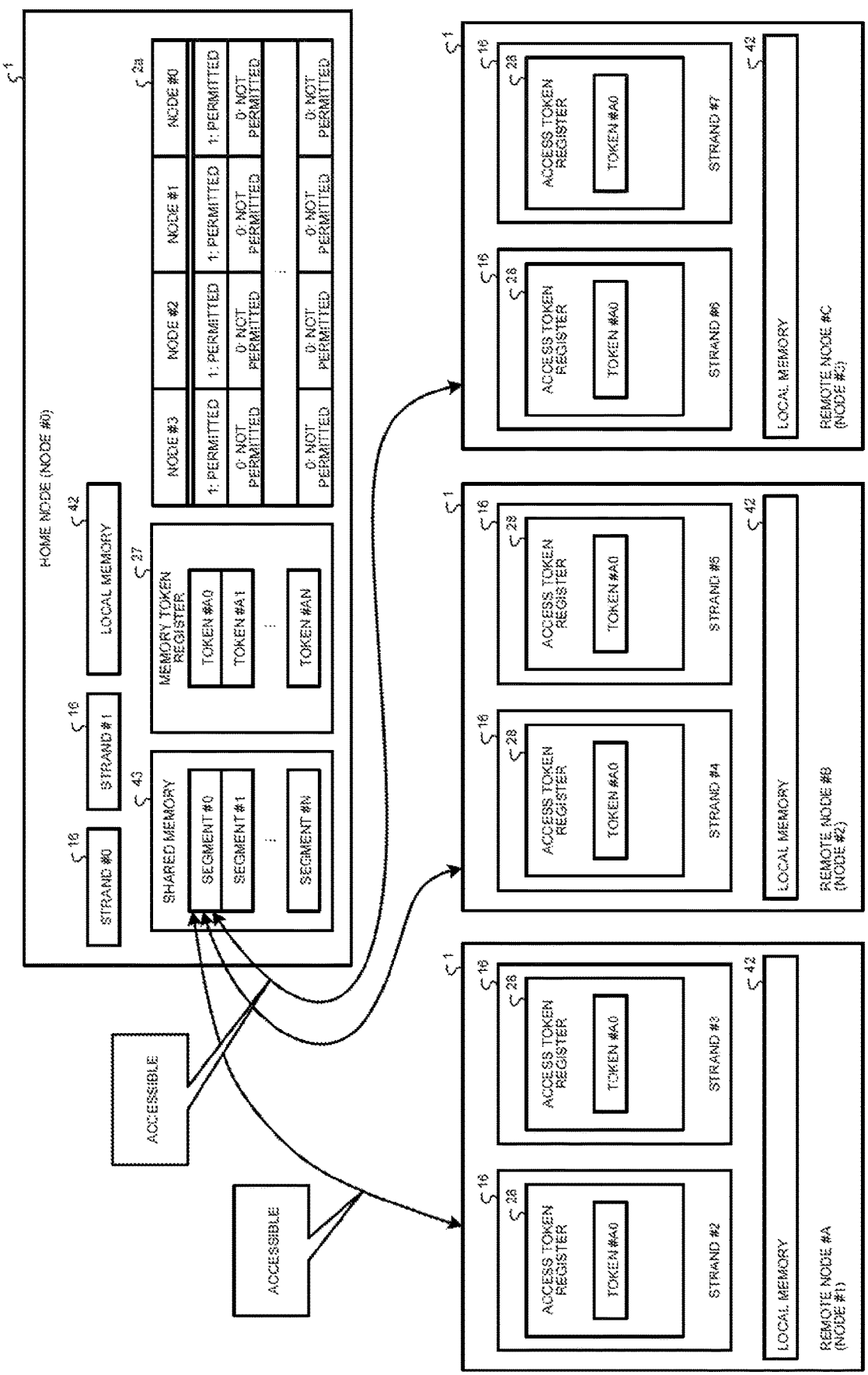
FIG. 6A is a first diagram for explanation of access permission for each node.
Figure 6B:
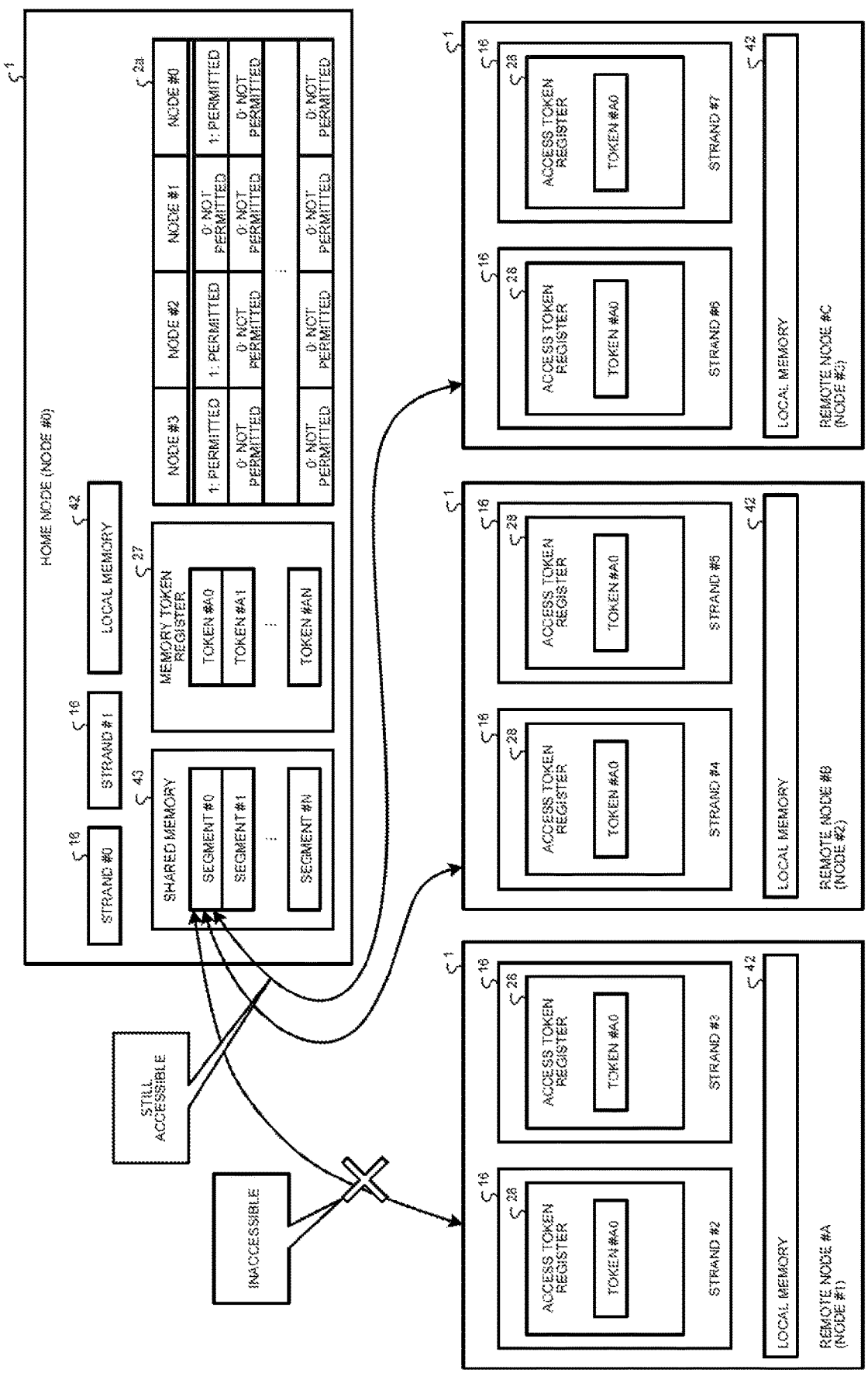
FIG. 6B is a second diagram for explanation of the access permission for each node.

FIG. 6A is a first diagram for explanation of access permission for each node, and FIG. 6B is a second diagram for explanation of the access permission for each node. FIG. 6A illustrates a case where the permission setting register 2a stores therein information indicating that access from all of the nodes 1 is permitted, and FIG. 6B illustrates a case where the permission setting register 2a stores therein information indicating that access from a part of the nodes 1 is not permitted. In FIG. 6A and FIG. 6B, a node #0 is a home node, and the node #1 to a node #3 are respectively a remote node # A to a remote node C. Further, FIG. 6A and FIG. 6B illustrate a case where each of the nodes 1 has one CPU chip 11, and each of the CPU chips 11 has one core 14. Further, a segment #0 to a segment # N denote segments of the shared memory 43, and a token # A0 to a token # AN denote tokens respectively associated with the segment #0 to the segment N.

As illustrated in FIG. 6A, the permission setting register 2a of the home node stores therein information indicating that access to the segment #0 from all of the nodes 1 is permitted. In the access token registers 28 of the three remote nodes, the token # A0 is stored correspondingly to the segment #0. Each of the remote nodes is able to access the segment #0 by using the access token stored in the access token register 28.

If an abnormality occurs in the remote node # A, as illustrated in FIG. 6B, the information corresponding to the segment #0, the information in the permission setting register 2a in the home node, is changed such that access from the remote node # A, that is, the node #1, is not be permitted. Therefore, the remote node #13 and the remote node # C continue to be able to access the segment #0, but access from the remote node # A to the segment #0 is blocked.

FIG. 7 is a diagram illustrating the permission setting register per node. In FIG. 7, the permission setting register 2a is represented by "node_enable_list" of 64 bits, and is able to store therein information on whether or not access is permitted, for up to 64 of the nodes 1. "Node_enable_list" is associated with a shared memory segment.

When node_enable_list[n]=0, the home node prohibits access from the node # n to the corresponding shared memory segment. Herein, 0≤n≤63. When the node # n is prohibited to access attempts to access the corresponding shared memory segment, a trap of access exception occurs in the node # n. When node_enable_list[n]=1, whether or not access from the node # n is permitted is examined according to the setting of the token for the segment corresponding to this register.

Figure 8B:
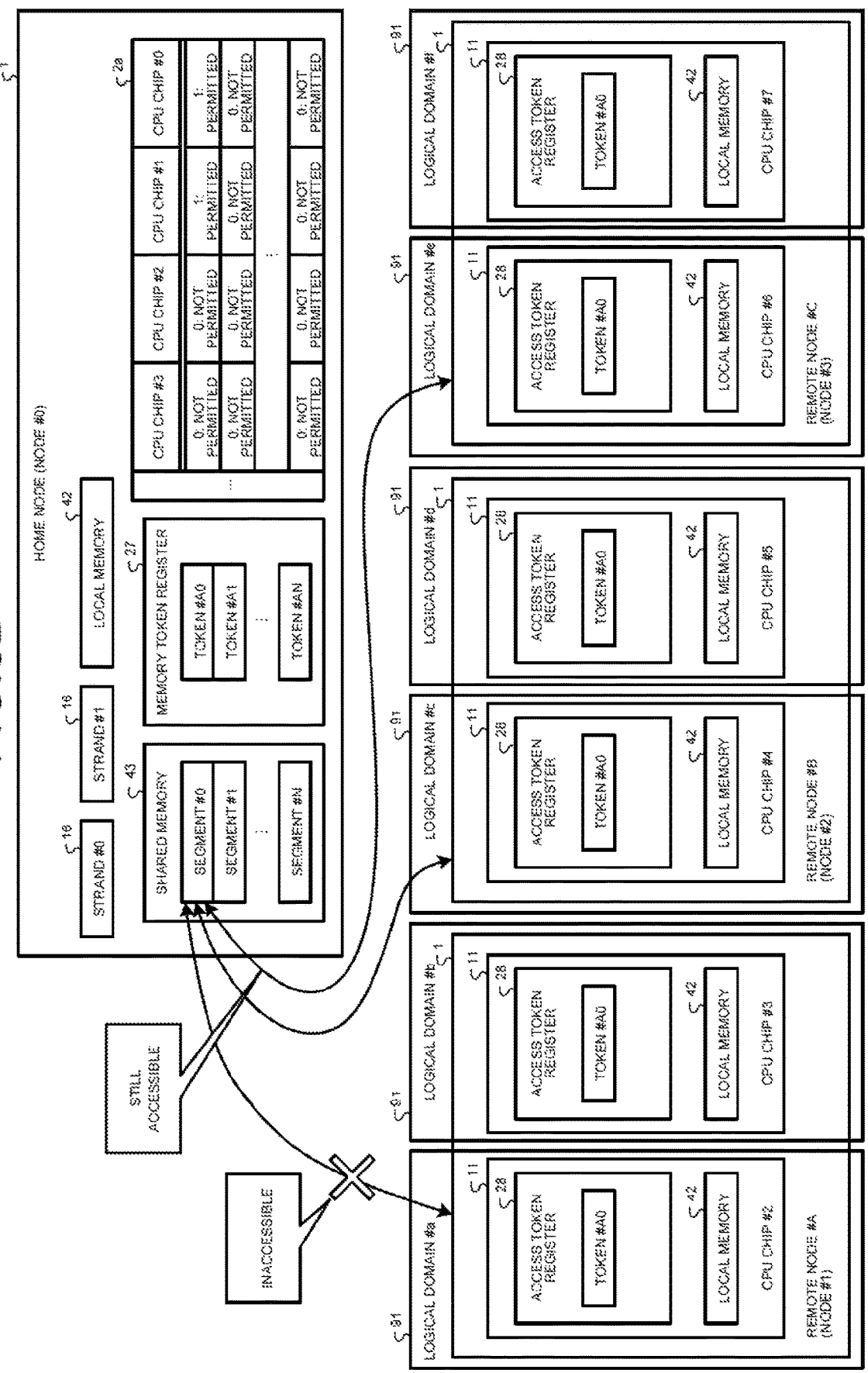
FIG. 8B is a second diagram for explanation of the access permission for each CPU chip.

FIG. 8A is a first diagram for explanation of access permission for each CPU chip, and FIG. 8B is a second diagram for explanation of access permission and denial for each CPU chip. FIG. 8A illustrates a case where the permission setting register 2a stores therein information indicating that access from all of the CPU chips 11 is permitted, and FIG. 8B illustrates a case where the permission setting register 2a stores therein information indicating that access from a part of the CPU chips 11 is not permitted. In FIG. 8A and FIG. 8B, a logical domain 91 is able to be generated for each CPU chip.

As illustrated in FIG. 8A, the permission setting register 2a of the home node stores therein information indicating that access to the segment #0 from all of the CPU chips 11 is permitted. In the access token registers 28 of the three remote nodes, the token # A0 is stored correspondingly to the segment #0. Each of the remote CPU chips is able to access the segment #0 by using the access token stored in the access token register 28.

If an abnormality occurs in the remote node # A, as illustrated in FIG. 8B, the information corresponding to the segment #0, the information in the permission setting register 2a in the home node, is changed such that access from a CPU chip #2 and a CPU chip #3 included in the remote node # A is not permitted. Therefore, a CPU chip #4 to a CPU chip #7 continue to be able to access the segment #0, but the access from the CPU chip #2 and CPU chip #3 to the segment #0 is blocked.

FIG. 9 is a diagram illustrating the permission setting register 2a per CPU chip. In FIG. 9, the permission setting register 2a is represented by "cpu_enable_list" of 64 bits, and is able to store therein information on whether or not access is permitted, for up to 64 of the CPU chips 11. "Cpu_enable_list" is associated with a shared memory segment.

Figure 10A:
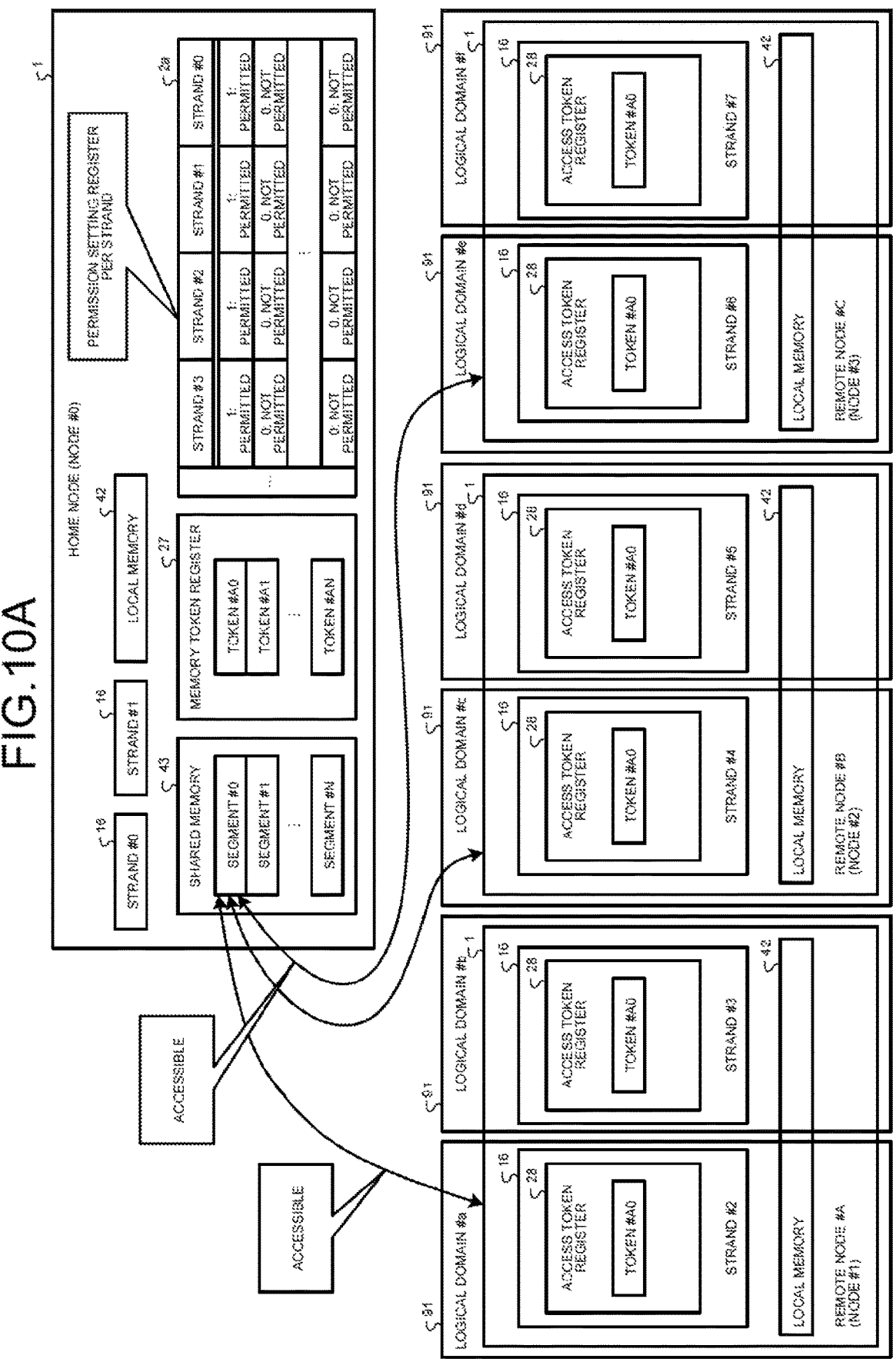
FIG. 10A is a first diagram for explanation of access permission for each strand.
Figure 10B:
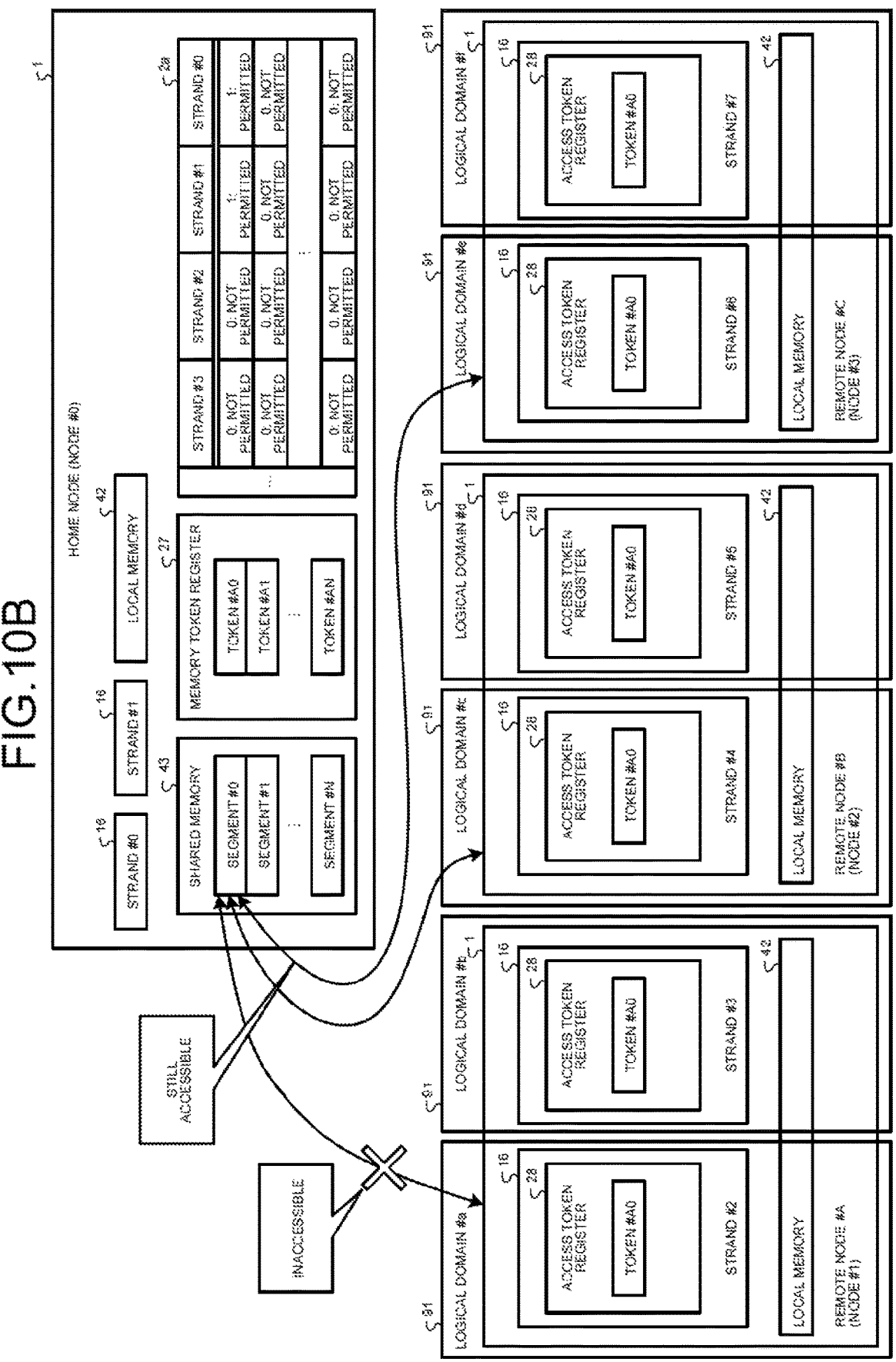
FIG. 10B is a second diagram for explanation of the access permission for each strand.

FIG. 10A is a first diagram for explanation of access permission for each strand, and FIG. 10B is a second diagram for explanation of access permission and denial for each strand. FIG. 10A illustrates a case where the permission setting register 2a stores therein information indicating that access from all of the strands 16 is permitted, and FIG. 10B illustrates a case where the permission setting register 2a stores therein information indicating that access from a part of the strands 16 is not permitted. In FIG. 10A and FIG. 10B, the logical domain 91 is able to be generated for each strand.

As illustrated in FIG. 10A, the permission setting register 2a of the home node stores therein information indicating that access to the segment #0 from all of the strands 16 is permitted. In the access token registers 28 of the three remote nodes, the token # A0 is stored correspondingly to the segment #0. Each of the remote strands is able to access the segment #0 by using the access token stored in the access token register 28.

If an abnormality occurs in the remote node # A, as illustrated in FIG. 10B, the information corresponding to the segment #0, the information in the permission setting register 2a in the home node, is changed such that access from a strand #2 and a strand #3 included in the remote node # A is not permitted. Therefore, a strand #4 to a strand #7 continue to be able to access the segment #0, but the access from the strand #2 and strand #3 to the segment #0 is blocked.

FIG. 11 is a diagram illustrating the permission setting register per strand. In FIG. 11, the permission setting register 2a is represented by "strand_enable_list[m]" of 64×m bits, and is able to store therein information on whether or not access is permitted, for up to 64×m of the strands 16. "Strand_enable_list[m]" is associated with a shared memory segment.

When strand_enable_list[m][n]=0, the home node prohibits access from a strand #(64×m+n) to the corresponding shared memory segment. Herein, m is 0 or a positive integer, and 0≤n≤63. When the strand #(64×m+n) prohibited to access attempts to access the corresponding shared memory segment, a trap of access exception occurs in the strand #(64×m+n). When strand_enable_list[m][n]=1, whether or not access from the strand #(64×m+n) is permitted is examined according to the setting of the token for the segment corresponding to this register.

Figure 12B:
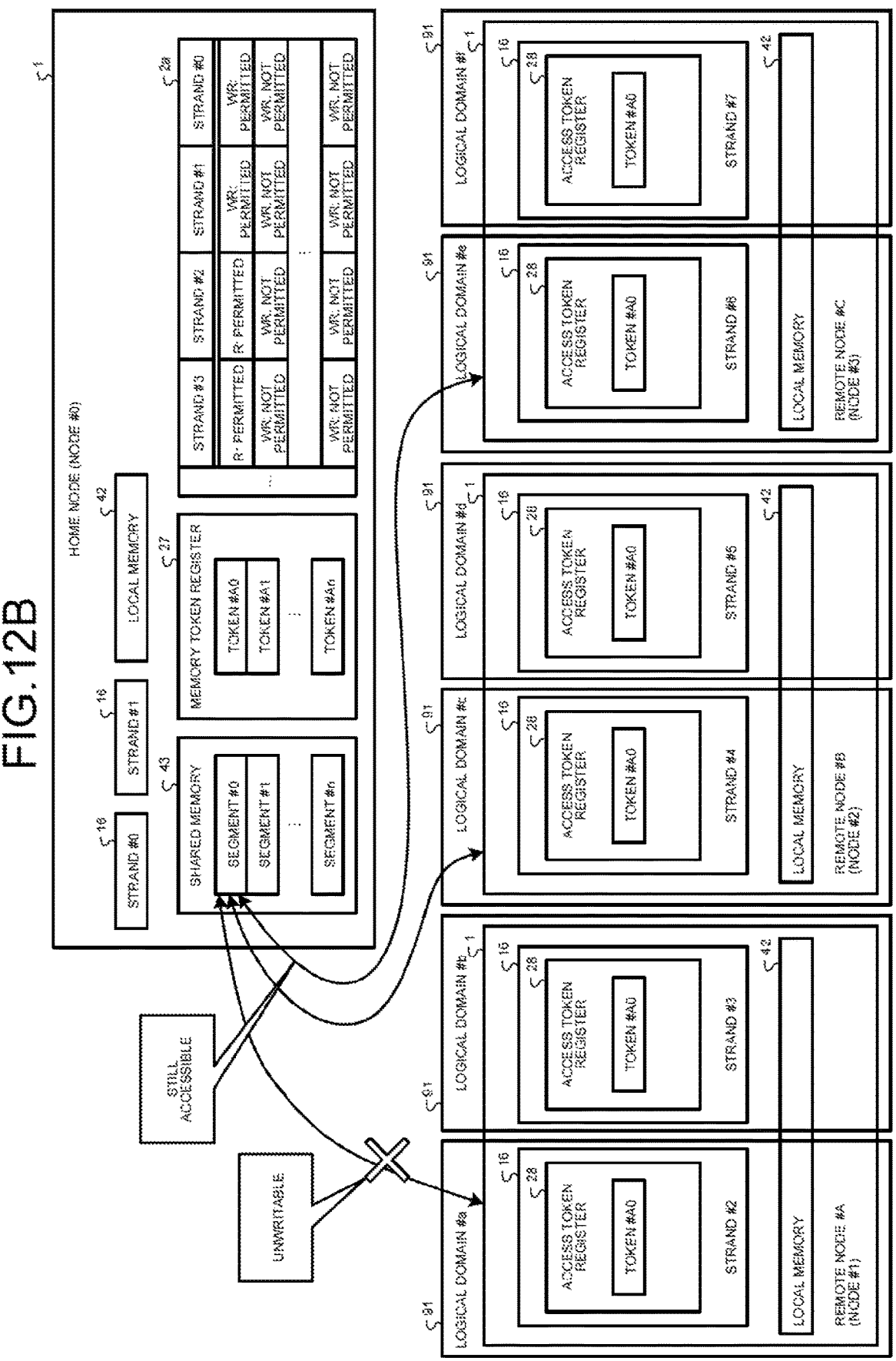
FIG. 12B is a second diagram for explanation of the read/write permission for each strand.

FIG. 12A is a first diagram for explanation of read/write permission for each strand, and FIG. 12B is a second diagram for explanation of read/write permission for each strand. FIG. 12A illustrates a case where the permission setting register 2a stores therein information indicating that read and write from all of the strands 16 are permitted, and FIG. 12B illustrates a case where the permission setting register 2a stores therein information indicating that write from a part of the strands 16 is not permitted.

As illustrated in FIG. 12A, the permission setting register 2a of the home node stores therein information indicating that read and write to the segment #0 from all of the strands 16 are permitted. In the access token registers 28 of the three remote nodes, the token # A0 is stored correspondingly to the segment #0. Each of the remote strands is able to access the segment #0 by using the access token stored in the access token register 28.

If an abnormality occurs in the remote node # A, as illustrated in FIG. 12B, the information corresponding to the segment #0, the information in the permission setting register 2a in the home node, is changed such that write from the strand #2 and strand #3 included in the remote node # A is not permitted. Therefore, the strand #4 to strand #7 continue to be able to read from and write to the segment #0, and the strand #2 and strand #3 continue to be able to read from the segment #0. On the contrary, the write from the strand #2 and strand #3 into the segment #0 is blocked.

FIG. 13A is a diagram illustrating a read permission setting register per strand and FIG. 13B is a diagram illustrating a write permission setting register per strand. The read permission setting register is a register of the permission setting register 2a, the register storing therein information indicating whether or not read is permitted, and the write permission setting register is a register of the permission setting register 2a, the register storing therein information indicating whether or not write is permitted. In FIG. 13A, the read permission setting register is represented by "strand_read_enable_list[m]" of 64×m bits. In FIG. 13B, the write permission setting register is represented by "strand_write_enable_list[m]" of 64×m bits.

In FIG. 13A, when strand_read_enable_list[m][n]=0, the home node prohibits read by the strand #(64×m+n) from the corresponding shared memory segment. In FIG. 13B, when strand_write_enable_list[m][n]=0, the home node prohibits write by the strand #(64×m+n) to the corresponding shared memory segment. When the strand #(64×m+n) prohibited to read or write attempts to read from or write to the corresponding shared memory segment, a trap of access exception occurs in the strand #(64×m+n). When strand_read_enable_list[m][n]=1, whether or not read from the strand #(64×m+n) is permitted is examined according to the setting of the token for the segment corresponding to this register. When strand_write_enable_list[m][n]=1, whether or not write from the strand #(64×m+n) is permitted is examined according to the setting of the token for the segment corresponding to this register.

Figure 14A:
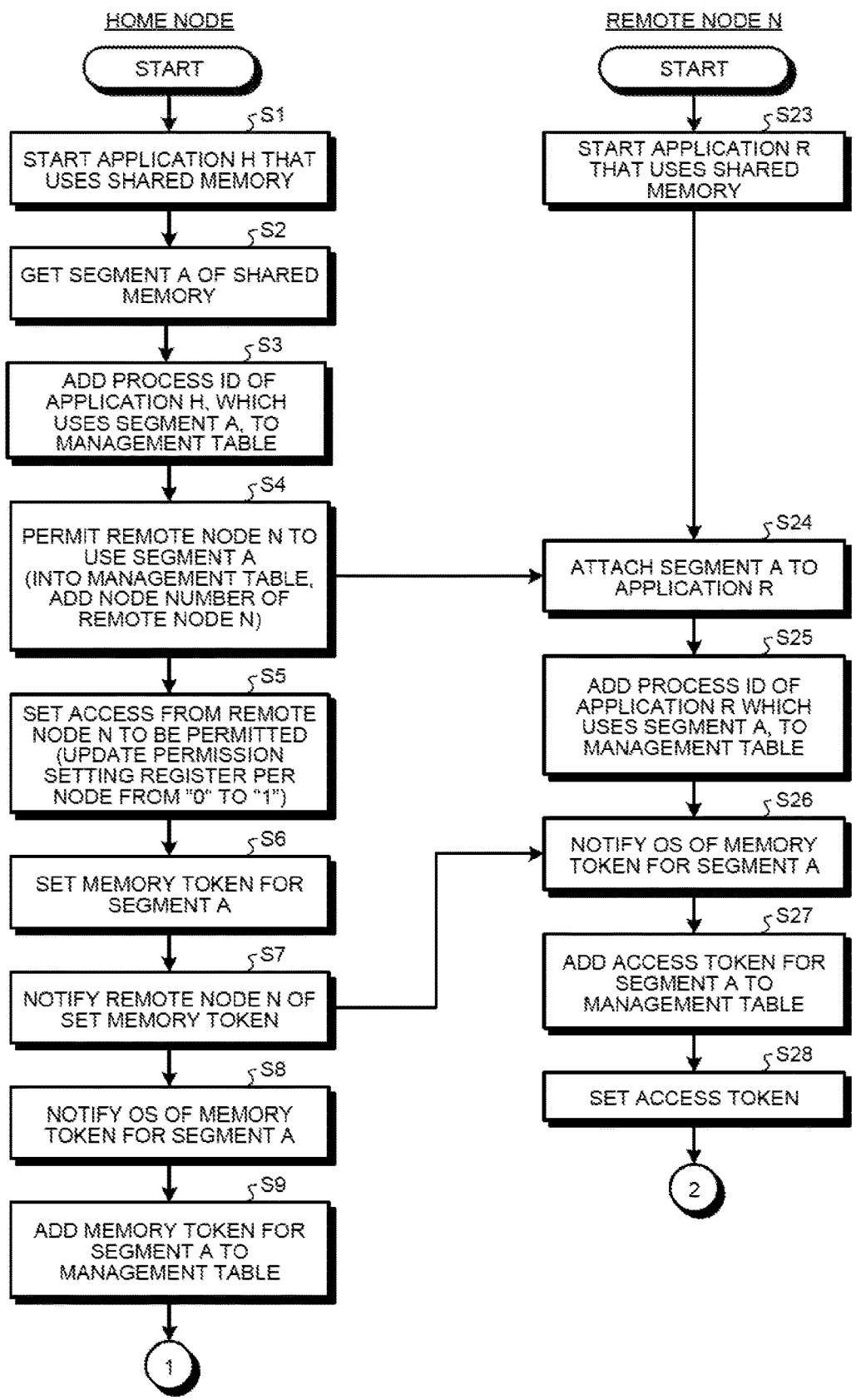
FIG. 14A is a first flowchart illustrating a flow of a process for using a shared memory (when whether or not accessible is settable for each node)
Figure 14B:
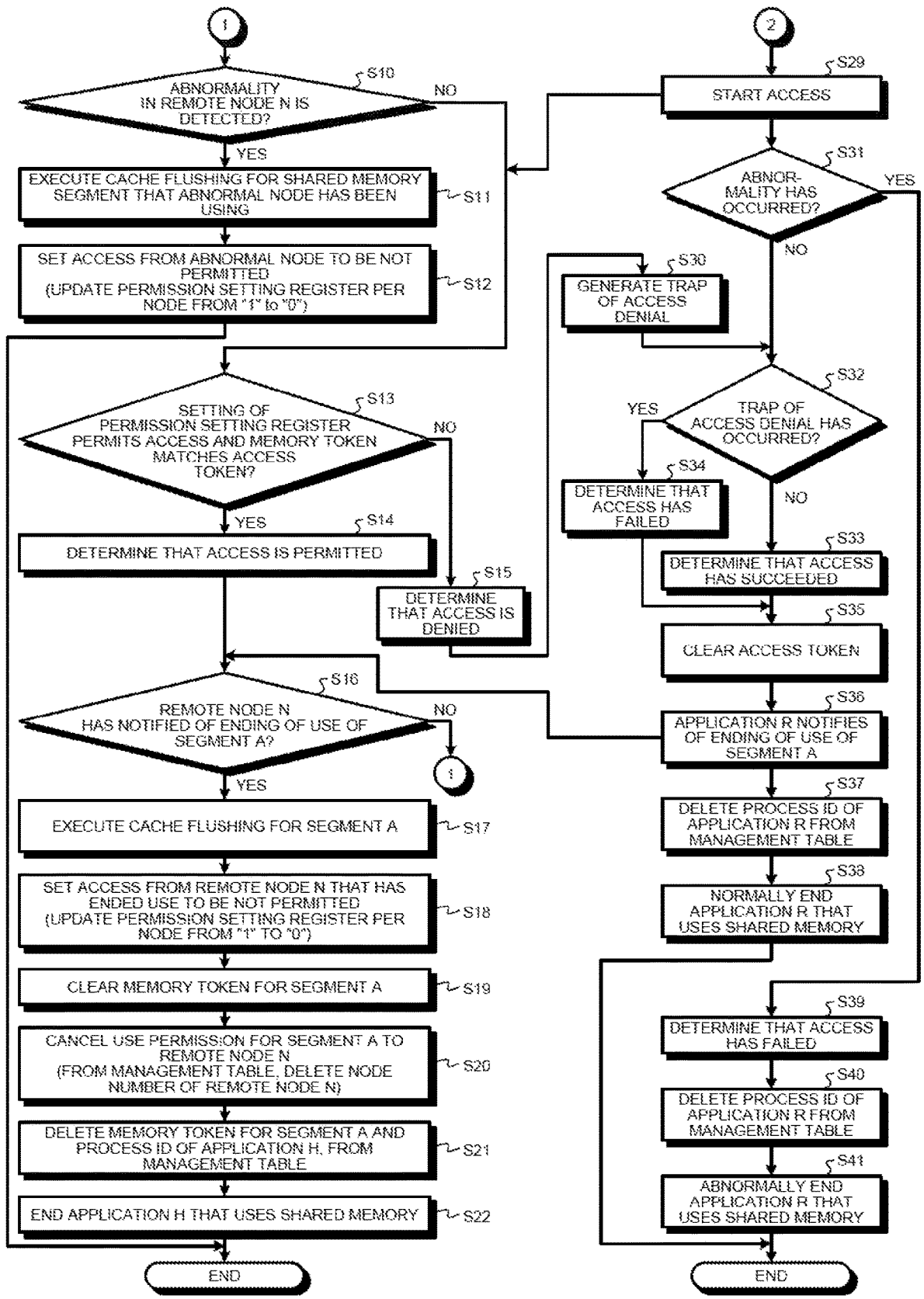
FIG. 14B is a second flowchart illustrating the flow of the process for using the shared memory (when whether or not accessible is settable for each node)
Figure 15A:
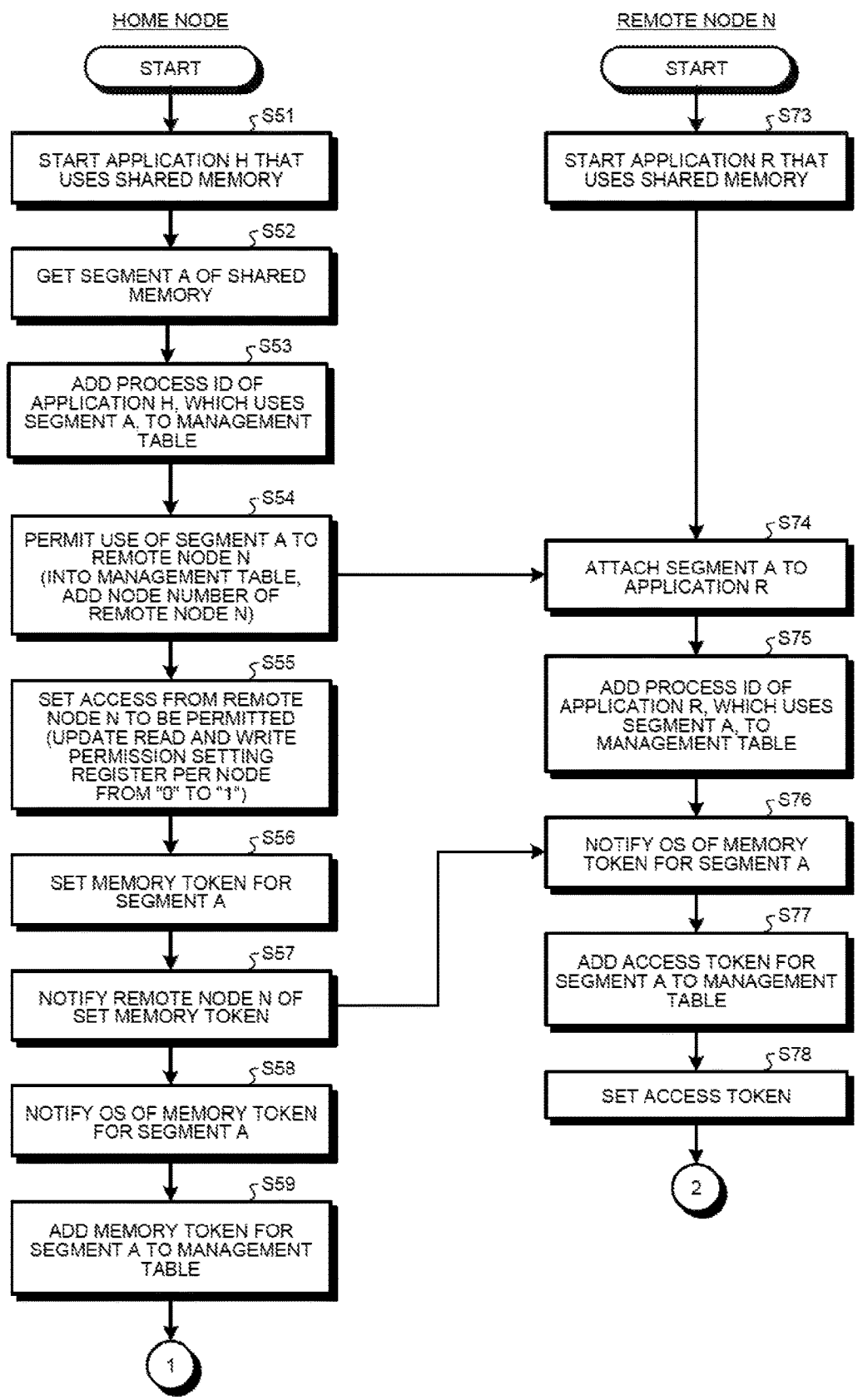
FIG. 15A is a first flowchart illustrating a flow of a process for using the shared memory (when read and write permission is settable for each node)
Figure 15B:
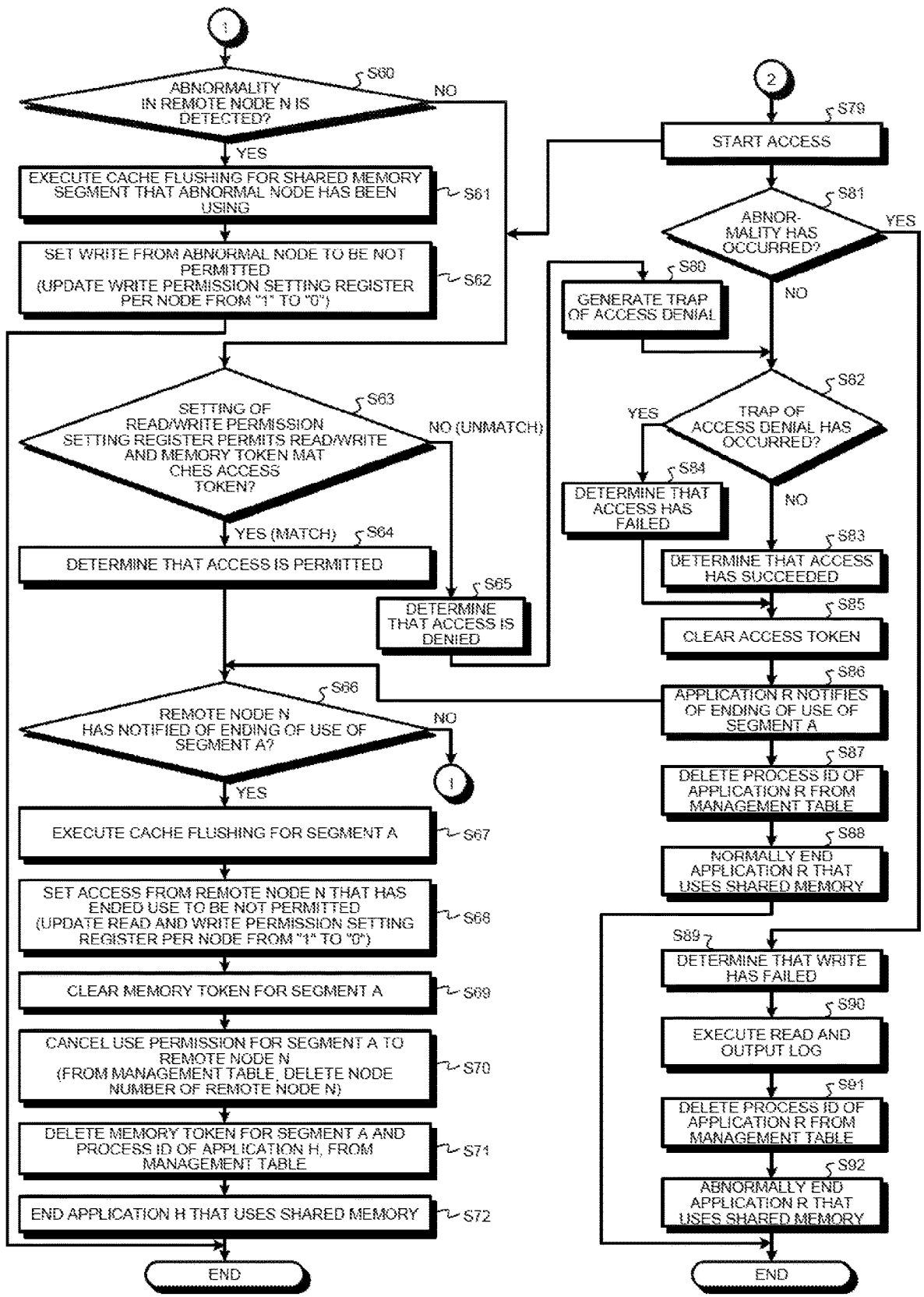
FIG. 15B is a second flowchart illustrating the flow of the process for using the shared memory (when read and write permission is settable for each node)

Next, a flow of a process for using the shared memory 43 will be described. FIG. 14A is a first flowchart illustrating the flow of the process for using the shared memory 43 (when whether or not accessible is settable for each node). FIG. 14B is a second flowchart illustrating the flow of the process for using the shared memory 43 (when whether or not accessible is settable for each node). FIG. 15A is a first flowchart illustrating a flow of a process for using the shared memory 43 (when read and write permission is settable for each node). FIG. 15B is a second flowchart illustrating the flow of the process for using the shared memory 43 (when read and write permission is settable for each node). FIG. 14A and FIG. 14B illustrate a case where the permission setting register 2a stores therein information on whether or not access is permitted for each node, and FIG. 15A and FIG. 15B illustrate a case where the permission setting register 2a stores therein information on whether or not each of read and write is permitted for each node.

As illustrated in FIG. 14A, on a home node, the OS 60 starts an application H, which is an application that uses the shared memory 43 (Step S1). The application H gets a segment A of the shared memory 43 (Step S2). The node and process managing unit 71 of the home node adds the process ID of the application H, which uses the segment A, to the management table 70 (Step S3).

Thereafter, the home node permits a remote node N to use the segment A of the shared memory 43, and notifies the remote node N of the use permission for the segment A (Step S4). The node and process managing unit 71 of the home node then adds the node number of the remote node N, which uses the segment A, to the management table 70.

On the remote node N, the OS 60 starts an application R that uses the shared memory (Step S23). The shared memory managing unit 61 of the remote node N attaches the segment A to the application R when the home node notifies the shared memory managing unit 61 of the use permission for the segment A (Step S24). Further, the node and process managing unit 71 of the remote node N adds the process ID of the application R, which uses the segment A, to the management table 70 (Step S25).

The home node then sets access from the remote node N to be permitted (Step S5). That is, the permission setting unit 72 updates, for the access from the remote node N to the segment A, the permission setting register 2a per node from "0" to "1". The home node then sets a memory token for the segment A (Step S6), and notifies the remote node N of the memory token for the segment A (Step S7). The home node then notifies the OS 60 of the memory token for the segment A (Step S8), and the OS 60 adds the memory token for the segment A to the management table 70 (Step S9).

When the home node notifies the application R on the remote node N of the memory token for the segment A, the application R notifies the OS 60 of the memory token for the segment A (Step S26). The shared memory managing unit 61 of the remote node N then adds the access token of the segment A to the management table 70 (Step S27), and sets the access token in the access token register 28 (Step S28). As illustrated in FIG. 14B, the application R of the remote node N then starts access to the segment A (Step S29).

Thereafter, if the home node detects an abnormality in the remote node N (Step S10; Yes), the cache flushing unit 74 executes cache flushing for the shared memory segment that the abnormal node has been using (Step S11). The permission canceling unit 75 then sets access from the abnormal node to be not permitted (Step S12). That is, the permission canceling unit 75 updates, for the access from the abnormal node to the segment A, the permission setting register 2a per node from "1" to "0".

On the contrary, if an abnormality is not detected in the remote node N (Step S10; No) and the home node receives access to the segment A, the checking unit 29 of the home node determines whether or not the setting of the permission setting register 2a corresponding to the access to the segment A from the remote node N permits the access (is "1") and whether or not the memory token for the segment A matches the access token (Step S13). If the setting of the permission setting register 2a permits the access (is "1"), and the memory token matches the access token, the checking unit 29 determines that the access is permitted (Step S14). On the contrary, if the setting of the permission setting register 2a does not permit the access, or the memory token for the segment A does not match the access token, the checking unit 29 determines that the access is denied (Step S15) and notifies the remote node N of the access denial. When the remote node N is notified of the access denial, the remote node N generates a trap of access denial (Step S30) and proceeds to Step S32.

If an abnormality has not occurred after the start of the access to the segment A (Step S31; No), the remote node N determines whether or not a trap of access denial has occurred (Step S32). As a result, if a trap of access denial has not occurred, the remote node N determines that the access has succeeded (Step S33), and if a trap of access denial has occurred, the remote node N determines that the access has failed (Step S34). Thereafter, the remote node N clears the access token (Step S35) and the application R notifies that the use of the segment A has ended (Step S36).

The home node determines whether or not the remote node N has notified that the use of the segment A has ended (Step S16), and returns to Step S10 if there has been no notification. If there has been the notification, the cache flushing unit 74 executes cache flushing for the segment A (Step S17). The permission canceling unit 75 then sets access from the remote node N that has ended the use to be not permitted (Step S18). That is, the permission canceling unit 75 updates, for the segment A, the permission setting register 2a per node from "1" to "0".

The home node clears the memory token for the segment A (Step S19), and the node and process managing unit 71 cancels the use permission for the segment A to the remote node N (Step S20). That is, the node and process managing unit 71 deletes the node number of the remote node N from the management table 70.

Further, the node and process managing unit 71 deletes the memory token for the segment A and the process ID of the application H, from the management table 70 (Step S21). The home node then ends the application H that uses the shared memory 43 (Step S22).

The node and process managing unit 71 of the remote node N deletes the access token for the segment A and the process ID of the application R from the management table 70 (Step S37). The remote node N then normally ends the application R that uses the shared memory 43 (Step S38).

Further, if an abnormality has occurred (Step S31; Yes), the remote node N determines that the access has failed (Step S39), and the node and process managing unit 71 deletes the access token for the segment A and the process ID of the application R from the management table 70 (Step S40). The remote node N then abnormally ends the application R that uses the shared memory 43 (Step S41).

As described above, if an abnormality occurs in the remote node N, the permission canceling unit 75 of the home node updates a part of the permission setting register 2a per node, the part corresponding to the remote node N, from "1" to "0", for the segment A that the remote node N has been using. Therefore, the home node is able to prevent access to the segment A from the remote node N, in which an abnormality has occurred.

Further, if the permission setting register 2a stores therein information on whether or not each of read and write is permitted for each node, as illustrated in FIG. 15A, on the home node, the OS 60 starts the application H, which is an application that uses the shared memory 43 (Step S51). The application H then gets the segment A of the shared memory 43 (Step S52). The node and process managing unit 71 of the home node then adds the process ID of the application H, which uses the segment A, to the management table 70 (Step S53).

Thereafter, the home node permits the remote node N to use the segment A of the shared memory 43, and notifies the remote node N of the use permission for the segment A (Step S54). The node and process managing unit 71 of the home node then adds the node number of the remote node N, which uses the segment A, to the management table 70.

On the remote node N, the OS 60 starts the application R that uses the shared memory 43 (Step S73). The shared memory managing unit 61 of the remote node N attaches the segment A to the application R when the home node notifies the shared memory managing unit 61 of the use permission for the segment A (Step S74). Further, the node and process managing unit 71 of the remote node N adds the process ID of the application R, which uses the segment A, to the management table 70 (Step S75).

The home node then sets read access and write access from the remote node N to be permitted (Step S55). That is, the permission setting unit 72 updates, for the access from the remote node N to the segment A, the read permission setting register and the write permission setting register per node from "0" to "1". The home node sets a memory token for the segment A (Step S56), and notifies the remote node N of the memory token for the segment A (Step S57). The home node then notifies the OS 60 of the memory token for the segment A (Step S58), and the OS 60 adds the memory token for the segment A to the management table 70 (Step S59).

When the home node notifies the application R on the remote node N of the memory token for the segment A, the application R notifies the OS 60 of the memory token for the segment A (Step S76). The shared memory managing unit 61 of the remote node N adds the access token for the segment A to the management table 70 (Step S77), and sets the access token in the access token register 28 (Step S78). As illustrated in FIG. 15B, the application R on the remote node N then starts access to the segment A (Step S79).

Thereafter, if the home node detects an abnormality in the remote node N (Step S60; Yes), the cache flushing unit 74 executes cache flushing for the shared memory segment that the abnormal node has been using (Step S61). The permission canceling unit 75 then sets write from the abnormal node to be not permitted (Step S62). That is, the permission canceling unit 75 updates, for the access from the abnormal node to the segment A, the write permission setting register per node from "1" to "0".

On the contrary, if an abnormality is not detected in the remote node N (Step S60; No) and the home node receives access to the segment A, the checking unit 29 of the home node determines whether or not the setting of the read/write permission setting register corresponding to the read/write access to the segment A from the remote node N permits read/write (is "1") and whether or not the memory token for the segment A matches the access token (Step S63). If the setting of the read/write permission setting register permits read/write (is "1"), and the memory token matches the access token, the checking unit 29 determines that the access is permitted (Step S64). On the contrary, if the setting of the read/write permission setting register does not permit read/write (is "0"), or the memory token for the segment A does not match the access token, the checking unit 29 determines that the access is denied (Step S65) and notifies the remote node N of the access denial. When the remote node N is notified of the access denial, the remote node N generates a trap of token unmatch (Step S80) and proceeds to Step S82.

If an abnormality has not occurred after the start of the access to the segment A (Step S81; No), the remote node N determines whether or not a trap of token unmatch has occurred (Step S82). As a result, if the trap has not occurred, the remote node N determines that the access has succeeded (Step S83), and if the trap has occurred, the remote node N determines that the access has failed (Step S84). Thereafter, the remote node N clears the access token (Step S85) and the application R notifies that the use of the segment A has ended (Step S86).

The home node determines whether or not the remote node N has notified the home node of ending of the use of the segment A (Step S66), and returns to Step S60 if there has been no notification. If there has been the notification, the cache flushing unit 74 executes cache flushing for the segment A (Step S67). The permission canceling unit 75 then sets access from the remote node N that has ended the use to be not permitted (Step S68). That is, the permission canceling unit 75 updates, for the segment A, the read permission setting register and the write permission setting register per node from "1" to "0".

The home node then clears the memory token for the segment A (Step S69), and the node and process managing unit 71 cancels the use permission for the segment A to the remote node N (Step S70). That is, the node and process managing unit 71 deletes the node number of the remote node N from the management table 70.

Further, the node and process managing unit 71 then deletes the memory token for the segment A and the process ID of the application H, from the management table 70 (Step S71). The home node then ends the application H that uses the shared memory 43 (Step S72).

The node and process managing unit 71 of the remote node N deletes the access token for the segment A and the process ID of the application R from the management table 70 (Step S87). The remote node N then normally ends the application R that uses the shared memory 43 (Step S88).

Further, if an abnormality has occurred (Step S81; Yes), the remote node N determines that the write has failed (Step S89), executes read from the segment A, and outputs a log (Step S90). The node and process managing unit 71 then deletes the access token for the segment A and the process ID of the application R from the management table 70 (Step S91). The remote node N then abnormally ends the application R that uses the shared memory 43 (Step S92).

As described above, if an abnormality occurs in the remote node N, the permission canceling unit 75 of the home node updates a part of the write permission setting register per node, the part corresponding to the remote node N, from "1" to "0", for the segment A that the remote node N has been using. Therefore, the home node is able to prevent access to the segment A from the remote node N, in which an abnormality has occurred.

Figure 16A:
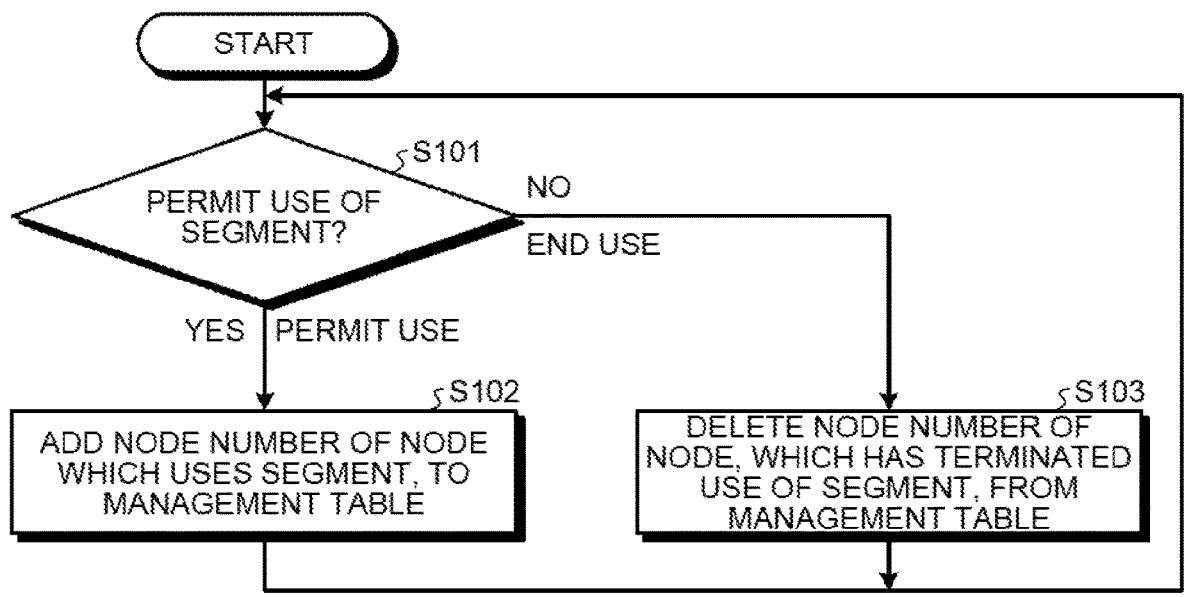
FIG. 16A is a flowchart illustrating a flow of a process of recognizing, per segment, a node that uses the shared memory.

Next, a flow of a process of recognizing, per segment, the node 1 that uses the shared memory 43 will be described. FIG. 16A is a flowchart illustrating the flow of the process of recognizing, per segment, the node 1 that uses the shared memory 43.

As illustrated in FIG. 16A, the node and process managing unit 71 in the home node determines whether it is when the remote node is permitted to use a segment of the shared memory 43 (step S101). As a result, if it is when the remote node is permitted to use a segment of the shared memory 43, the node and process managing unit 71 in the home node adds the node number of the node 1, which uses the segment, to the management table 70 (step S102).

Conversely, if it is not when the remote node is permitted to use the segment of the shared memory 43, i.e., if the use is terminated, the node and process managing unit 71 in the home node deletes the node number of the node 1, which has terminated the use of the segment, from the management table 70 (step S103).

In this way, the node and process managing unit 71 in the home node uses the management table 70 to manage the node number of the node 1 that uses a segment, thereby determining the remote node that uses the segment.

Figure 16B:
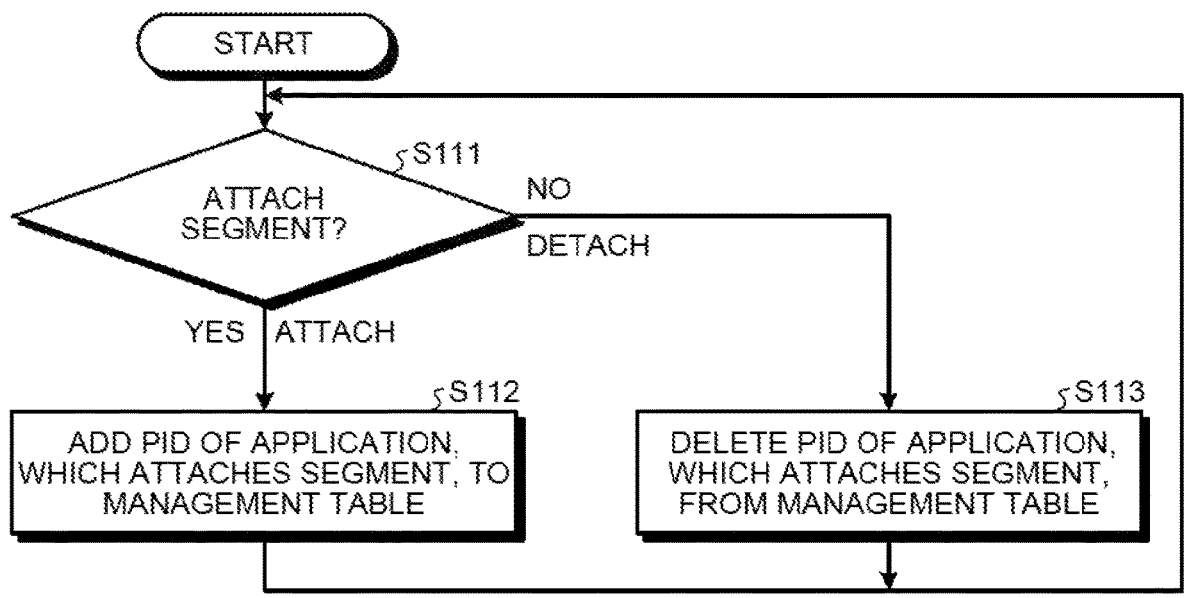
FIG. 16B is a flowchart that illustrates a flow of a process to determine a process that uses the shared memory on a per-segment basis.

Next, an explanation is given of the flow of the process to determine the process that uses the shared memory 43 on a per-segment basis. FIG. 16B is a flowchart that illustrates the flow of the process to determine the process that uses the shared memory 43 on a per-segment basis.

As illustrated in FIG. 16B, the node and process managing unit 71 of a remote node determines whether it is when a segment is attached (Step S111). As a result, if it is when a segment is attached, the node and process managing unit 71 in the remote node adds the PID of the application, which uses the segment, to the management table 70 (Step S112).

Conversely, if it is not when a segment is attached, i.e., if it is detached, the node and process managing unit 71 in the remote node deletes the PID of the application, which detaches the segment, from the management table 70 (Step S113).

In this way, the node and process managing unit 71 in the remote node uses the management table 70 to manage the PID of the application that uses a segment, thereby determining the application that uses the segment.

Figure 18:
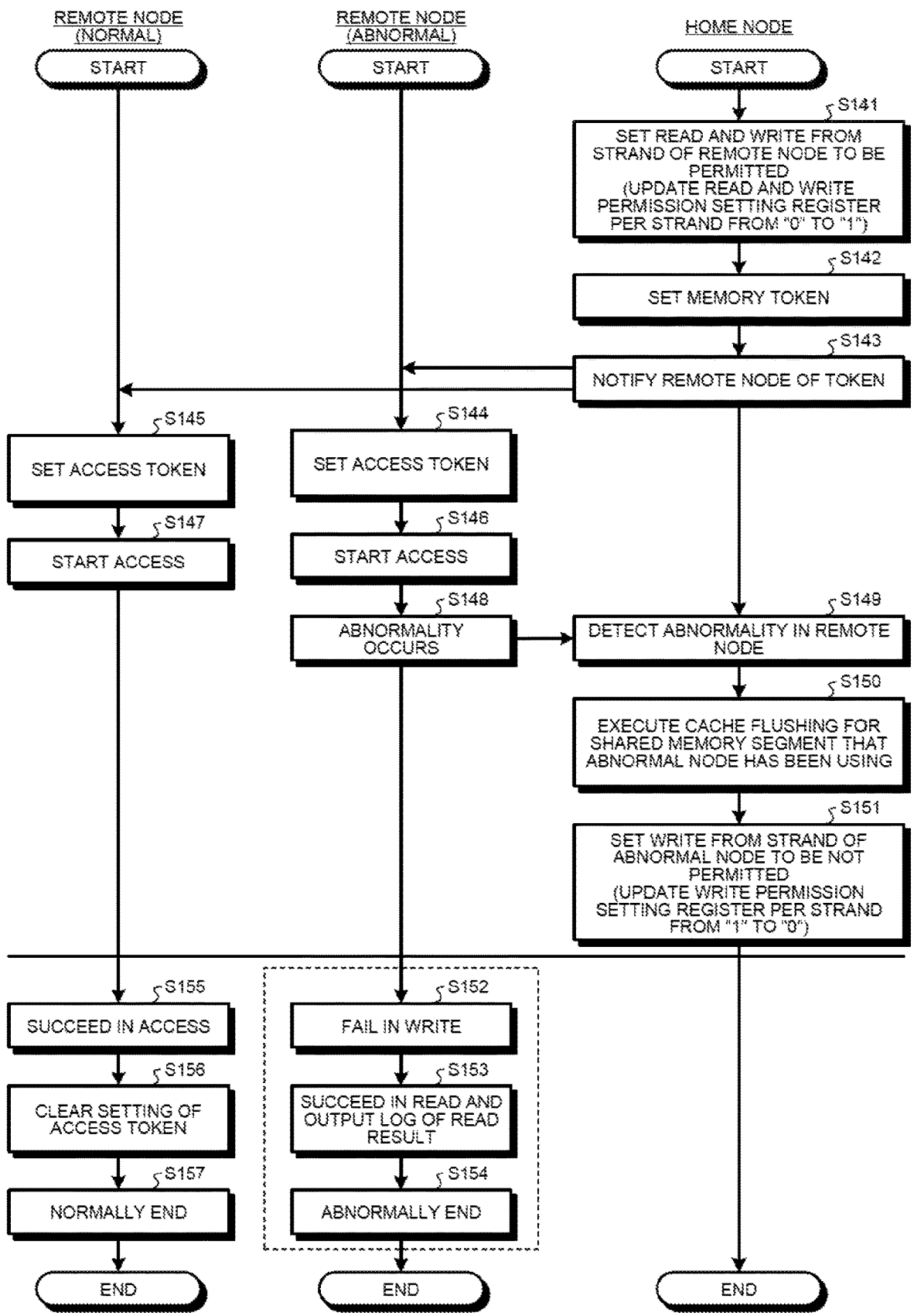
FIG. 18 is a flowchart illustrating a flow of a process upon occurrence of an abnormality in a node (when read and write permission is settable for each node)

Next, flows of processes upon occurrence of an abnormality in a node will be described. FIG. 17 is a flowchart illustrating a flow of a process upon occurrence of an abnormality in a node (when whether or not accessible is settable for each node), and FIG. 18 is a flowchart illustrating a flow of a process upon occurrence of an abnormality in a node (when read and write permission is settable for each strand). FIG. 17 illustrates a case where the permission setting register 2a stores therein information on whether or not access is permitted for each node, and FIG. 18 illustrates a case where the permission setting register 2a stores therein information on whether or not each of read and write is permitted for each strand.

As illustrated in FIG. 17, the permission setting unit 72 of the home node sets access from remote nodes to be permitted (Step S121). That is, the permission setting unit 72 updates, for the shared memory segment that the remote nodes use, the permission setting register 2a per node from "0" to "1". The home node then sets a memory token for the shared memory segment that the remote nodes use (Step S122), and notifies the remote nodes of the token (Step S123).

The remote nodes notified of the token set the access token (Step S124 and Step S125) and start access to the shared memory segment (Step S126 and Step S127). If an abnormality occurs in one of the remote nodes (Step S128), the home node detects the abnormality in that remote node (Step S129).

The cache flushing unit 74 then executes cache flushing for the shared memory segment that the abnormal node has been using (Step S130). The permission canceling unit 75 then sets access from the abnormal node to be not permitted (Step S131). That is, the permission canceling unit 75 updates, for the access from the abnormal node to the shared memory segment that the abnormal node has been using, the permission setting register 2a per node from "1" to "0".

Thereafter, when the remote node, in which the abnormality has occurred, attempts to access the shared memory segment, the access fails (Step S132) and the processing ends abnormally (Step S133). Further, when a normal remote node attempts to access the shared memory segment, the access succeeds (Step S134). Thereafter, when the normal remote node ends the use of the shared memory segment, the access token is cleared (Step S135), and the processing ends normally (Step S136).

As described above, the permission canceling unit 75 updates, for the access from the abnormal node to the shared memory segment that the abnormal node has been using, the permission setting register 2a per node from "1" to "0". Therefore, the home node is able to instantly block only the access from the abnormal node.

Further, if the permission setting register 2a stores therein information on whether each of read and write is permitted for each strand, as illustrated in FIG. 18, the permission setting unit 72 sets read and write from the strands 16 in remote nodes to be permitted (Step S141). That is, the permission setting unit 72 of the home node updates, for the access to the shared memory segment that the strands 16 in the remote nodes use, the read permission setting register and the write permission setting register per strand from "0" to "1". The home node then sets a memory token for the shared memory segment that the strands 16 in the remote nodes use (Step S142), and notifies the strands 16 in the remote nodes of the token (Step S143).

The strands 16 in the remote nodes notified of the token set the access token (Step S144 and Step S145) and start access to the shared memory segment (Step S146 and Step S147). If an abnormality occurs in one of the remote nodes (Step S148), the home node detects the abnormality in that remote node (Step S149).

The cache flushing unit 74 then executes cache flushing for the shared memory segment that the abnormal node has been using (Step S150). The permission canceling unit 75 then sets write from the strand 16 in the abnormal node to be not permitted (Step S151). That is, the permission canceling unit 75 updates, for the shared memory segment that the abnormal node has been using, the write permission setting register for the strand 16 in the abnormal node from "1" to "0".

Thereafter, when the remote node, in which the abnormality has occurred, attempts to write into the shared memory segment, the write fails (Step S152). When the remote node, in which the abnormality has occurred, attempts to read from the shared memory segment where the write has failed; the read succeeds, and a log of results of the read is output (Step S153). The processing for the remote node, in which the abnormality has occurred, ends abnormally (Step S154). Further, when a normal remote node attempts to access the shared memory segment, the access succeeds (Step S155). Thereafter, when the normal remote node ends the use of the shared memory segment, the setting of the access token is cleared (Step S156), and the processing ends normally (Step S157).

As described above, the permission canceling unit 75 updates, for the shared memory segment that the abnormal node has been using, the write permission setting register for the strand 16 included in the abnormal node from "1" to "0", and thus the home node is able to instantly block only the access from the abnormal node.

As described above, in the first embodiment, the permission setting register 2a stores therein the information indicating whether or not access is to be permitted to each of the nodes 1, per segment of the shared memory 43. When an abnormality occurs in the node 1, the permission canceling unit 75 sets the information in the permission setting register 2a, the information corresponding to the abnormal node, such that access to the segment that the abnormal node has been using is not permitted. If there is an access request from a remote node to a shared memory segment, the checking unit 29 determines, with hardware, whether or not the access is permitted, based on: the permission setting register 2a; the access token included in the access request; and the memory token register 27. Therefore, the home node is able to instantly block access from an abnormal node to a segment that the abnormal node has been using, and to continue permitting access from a normal node.

Instead of storing therein the information indicating whether or not access is permitted to each of the nodes 1, the permission setting register 2a may store therein information indicating whether or not access is permitted to each of the CPU chips 11, each of the cores 14, each of the strands 16, each of virtual nodes, or each of virtual CPUs. Herein, a virtual node is a node forming one logical domain 91 and a virtual CPU is a logical CPU. Further, instead of storing therein the information indicating whether or not access is permitted, the permission setting register 2a may store therein information indicating whether or not each of read access and write access is permitted.

When access permission is made settable per CPU chip by use of the permission setting register 2a per CPU chip, token control different for each CPU chip is enabled, and thus domain division per CPU chip will be enabled and virtual nodes will be able to be generated. Similarly, when access permission is made settable per core by use of the permission setting register 2a per core, token control different for each core is enabled, and thus domain division per core will be enabled and virtual nodes will be able to be generated. When the access permission is settable per core, granularity of the virtual nodes becomes smaller than when the access permission is settable per CPU chip. Further, similarly, when access permission is made settable per strand by use of the permission setting register 2a per strand, token control different for each strand is enabled, and thus domain division per strand will be enabled and virtual nodes will be able to be generated. When the access permission is settable per strand, granularity of the virtual nodes becomes even smaller than when the access permission is settable per CPU chip or per core.

Further, according to the first embodiment, when an abnormality occurs in the node 1, the cache flushing unit 74 executes cache flushing for the shared memory segment that the abnormal node has been using, before the permission canceling unit 75 sets the permission setting register 2a. Therefore, in a state where the cache coherence is maintained, the home node is able to block access from the abnormal node to the shared memory segment that the abnormal node has been using.

Further, an abnormality may occur in an application, instead of occurring in the node 1. If an abnormality occurs in an application, information in the permission setting register 2a, the information corresponding to the node 1, on which the abnormal application is running, is set so as to not permit access to the shared memory segment that the abnormal application has been using.

Further, according to the first embodiment, by use of the read/write permission setting register per CPU chip/core/strand, read/write permission is able to be set per CPU chip/core/strand. Therefore, only write from a particular CPU chip/core/strand is able to be set to be not permitted (while read is permitted). Therefore, data destruction due to unauthorized write from an abnormal node/abnormal application is able to be prevented, and recovery processing, such as reading data in the shared memory and writing out a log to a disk with the abnormal node/abnormal application, is able to be executed.

Further, in the first embodiment, a case, where the numbers of the nodes 1, to which use has been permitted, are recorded in the management table 70, has been described, but the CPU chips 11, cores 14, or strands 16, to which use has been permitted, may be recorded in the management table. In this case, the CPU chips 11, cores 14, or strands 16 function as the information processing apparatuses.

Further, in the first embodiment, a case where use is permitted every time an application gets a segment has been described, but use of a segment included in the attached shared memory 43 may be permitted when a certain range of the shared memory 43 is attached to an application.

[b] Second Embodiment

In the above described first embodiment, a case has been described, where access from an abnormal node is blocked by changing information in the permission setting register 2a, the information corresponding to the abnormal node, such that access is not permitted. However, without use of the permission setting register 2a, by use of plural tokens for each segment, access from an abnormal node may be blocked. Therefore, in a second embodiment, an information processing system, in which access from an abnormal node is blocked by a plural token scheme of using plural tokens for each segment, will be described.

Since a functional configuration of a shared memory managing unit and a configuration of a memory token register in the information processing system according to the second embodiment are different from those of the information processing system 2 according to the first embodiment, mainly the functional configuration of the shared memory managing unit and the configuration of the memory token register will be described.

Figure 19:
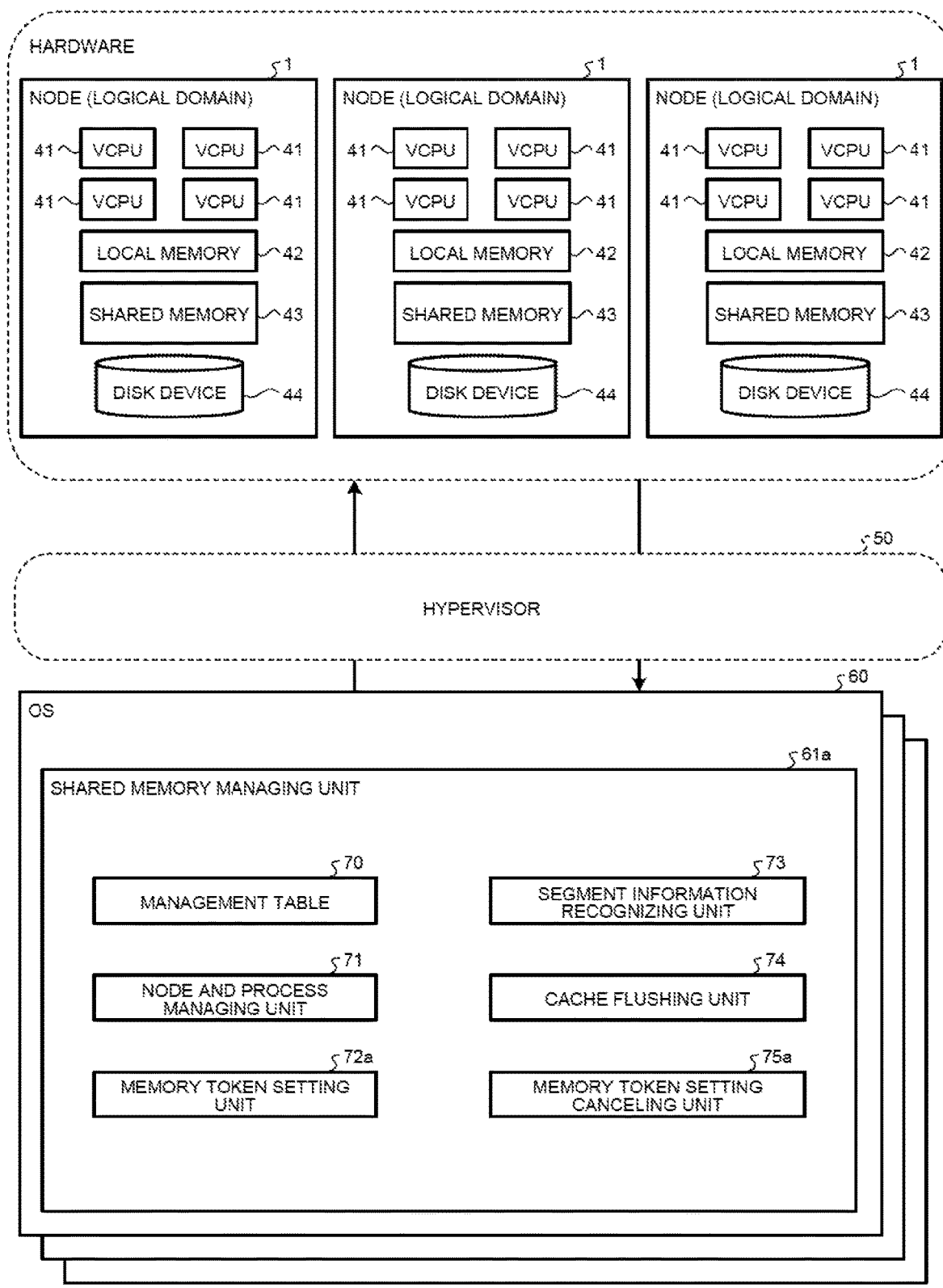
FIG. 19 is a diagram illustrating a logical hardware configuration and a software functional configuration, of an information processing system according to a second embodiment.

FIG. 19 is a diagram illustrating a logical hardware configuration and a software functional configuration, of the information processing system according to the second embodiment. For convenience of explanation, detailed description of any functional units playing roles similar to those of the respective parts illustrated in FIG. 3 will be omitted by appending the same signs. As illustrated in FIG. 19, a shared memory managing unit 61a according to the second embodiment has: the management table 70; the node and process managing unit 71; a memory token setting unit 72a; the segment information recognizing unit 73; the cache flushing unit 74; and a memory token setting canceling unit 75a.

The memory token setting unit 72a sets, in a memory token register, a token different for each node or for each application. That is, the memory token register according to the second embodiment stores therein plural tokens for each segment. The memory token setting unit 72a of a home node notifies the shared memory managing unit 61a in a remote node of a token dedicated to that node or application. The shared memory managing unit 61a of each remote node sets the token dedicated to the node or application in the access token register 28.

The memory token setting canceling unit 75a cancels setting of a memory token. If an abnormality in a remote node is detected, the memory token setting canceling unit 75a cancels only the setting of a token corresponding to the abnormal node, the token for a segment, for which its own node has a physical memory, the segment from the segments that the abnormal node has been using. Thereby, only access from the abnormal node is instantly blocked hardware-wise. Further, if an abnormality in an application is detected, the memory token setting canceling unit 75a cancels only the setting of a token corresponding to the abnormal application, the token for a segment, for which its own node has a physical memory, the segment from the segments that the abnormal application has been using. Thereby, only access from the abnormal application is instantly blocked hardware-wise.

Figure 20A:
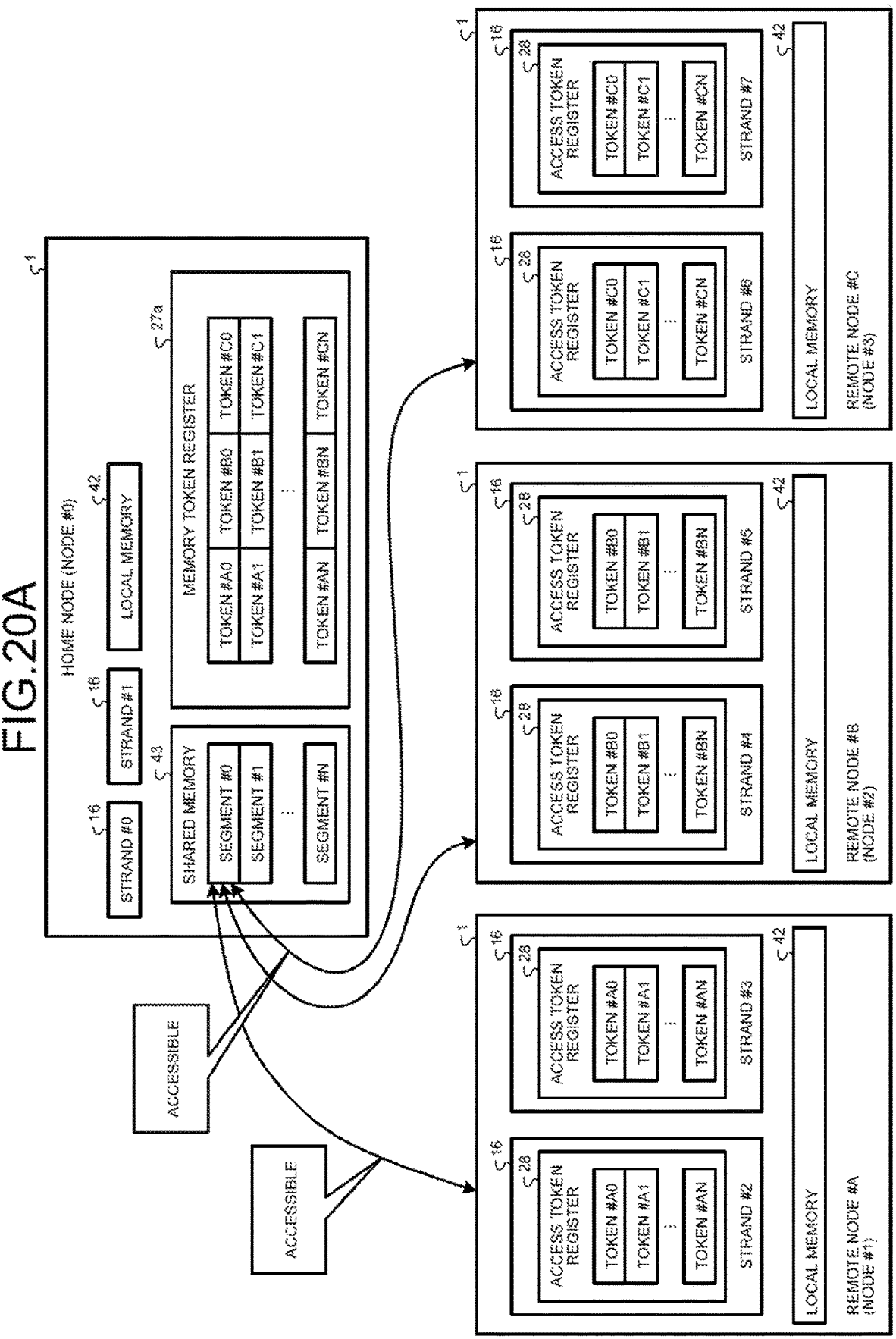
FIG. 20A is a first diagram for explanation of a plural token scheme.
Figure 20B:
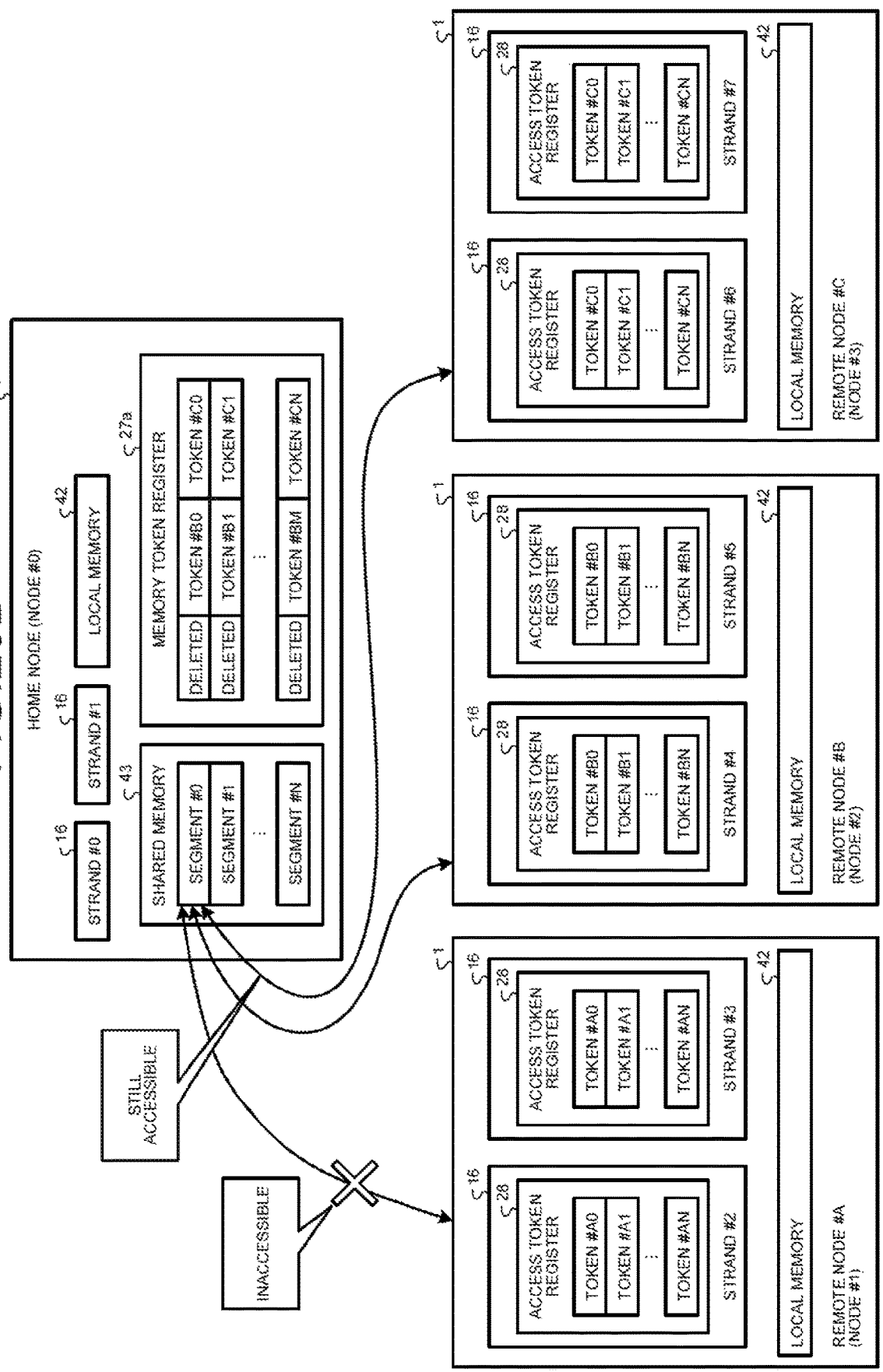
FIG. 20B is a second diagram for explanation of the plural token scheme.

FIG. 20A is a first diagram for explanation of the plural token scheme, and FIG. 20B is a second diagram for explanation of the plural token scheme. FIG. 20A illustrates a case where a memory token register 27a of a home node stores therein plural tokens for each segment, and the access token register 28 of each remote node stores therein tokens dedicated to the node. FIG. 20B illustrates a case where a part of the memory token register 27a of the home node has been deleted.

As illustrated in FIG. 20A, the memory token register 27a stores therein three tokens # A0 to # C0 correspondingly to a segment #0. The token # A0 is dedicated to a remote node # A, the token # B0 is dedicated to a remote node # B, and the token # C0 is dedicated to a remote node C. Similarly, the memory token register 27a stores therein three tokens # A1 to # C1 correspondingly to a segment #1, and three tokens # AN to # CN correspondingly to a segment N. Each of the remote nodes is able to access the segment #0 to the segment # N by using the access tokens stored in the access token register 28.

If an abnormality occurs in the remote node # A, as illustrated in FIG. 20B, the token # A0 to token # AN corresponding to the segment #0 to segment # N, which have been being used by the remote node # A, are deleted from the memory token register 27a in the home node. Therefore, the remote node #13 and the remote node # C continue to be able to access the segment #0 to segment # N, but access from the remote node # A to the segment #0 to segment # N is blocked.

Figure 21A:
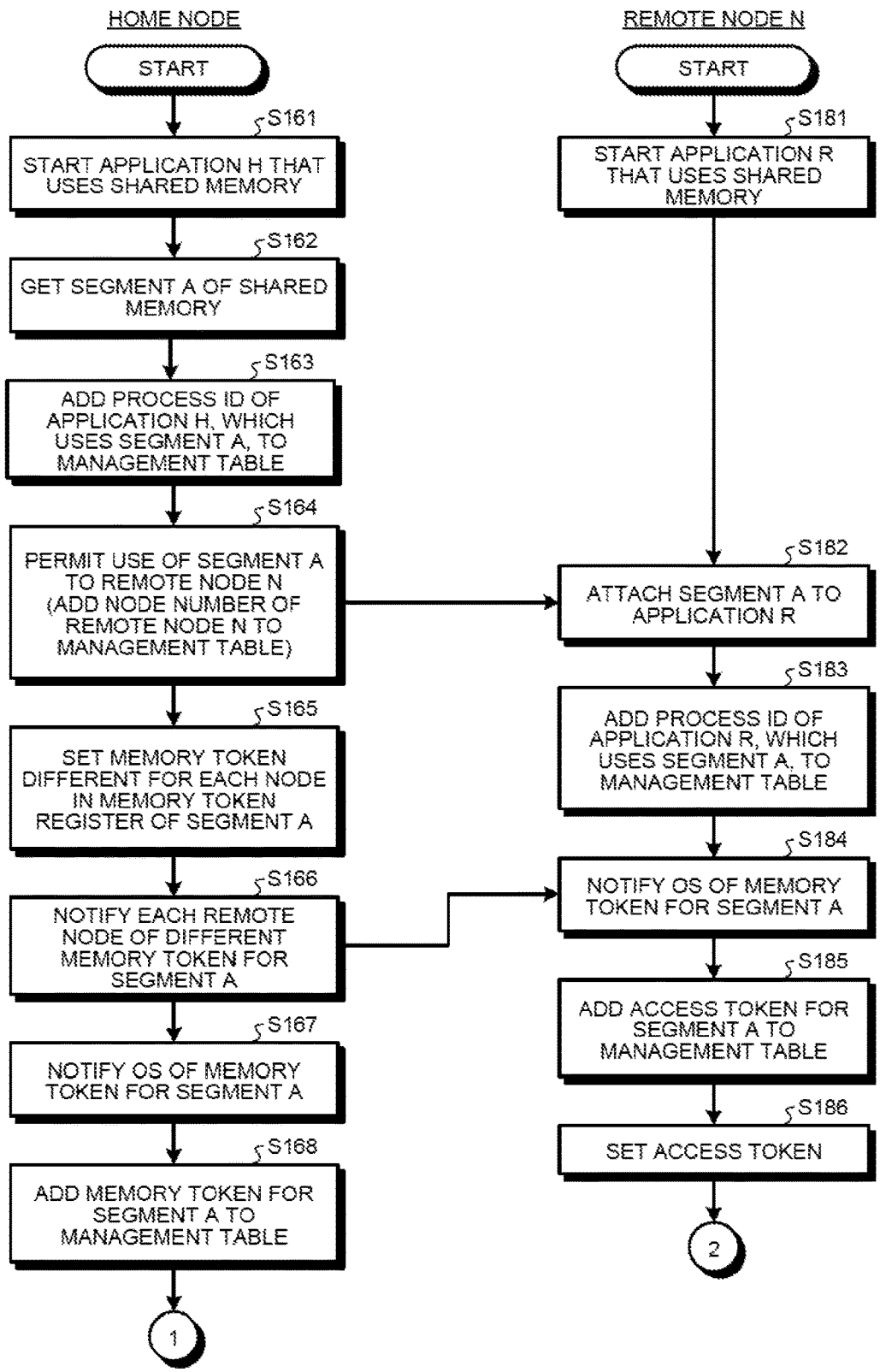
FIG. 21A is a first flowchart illustrating a flow of a process for using a shared memory.
Figure 21B:
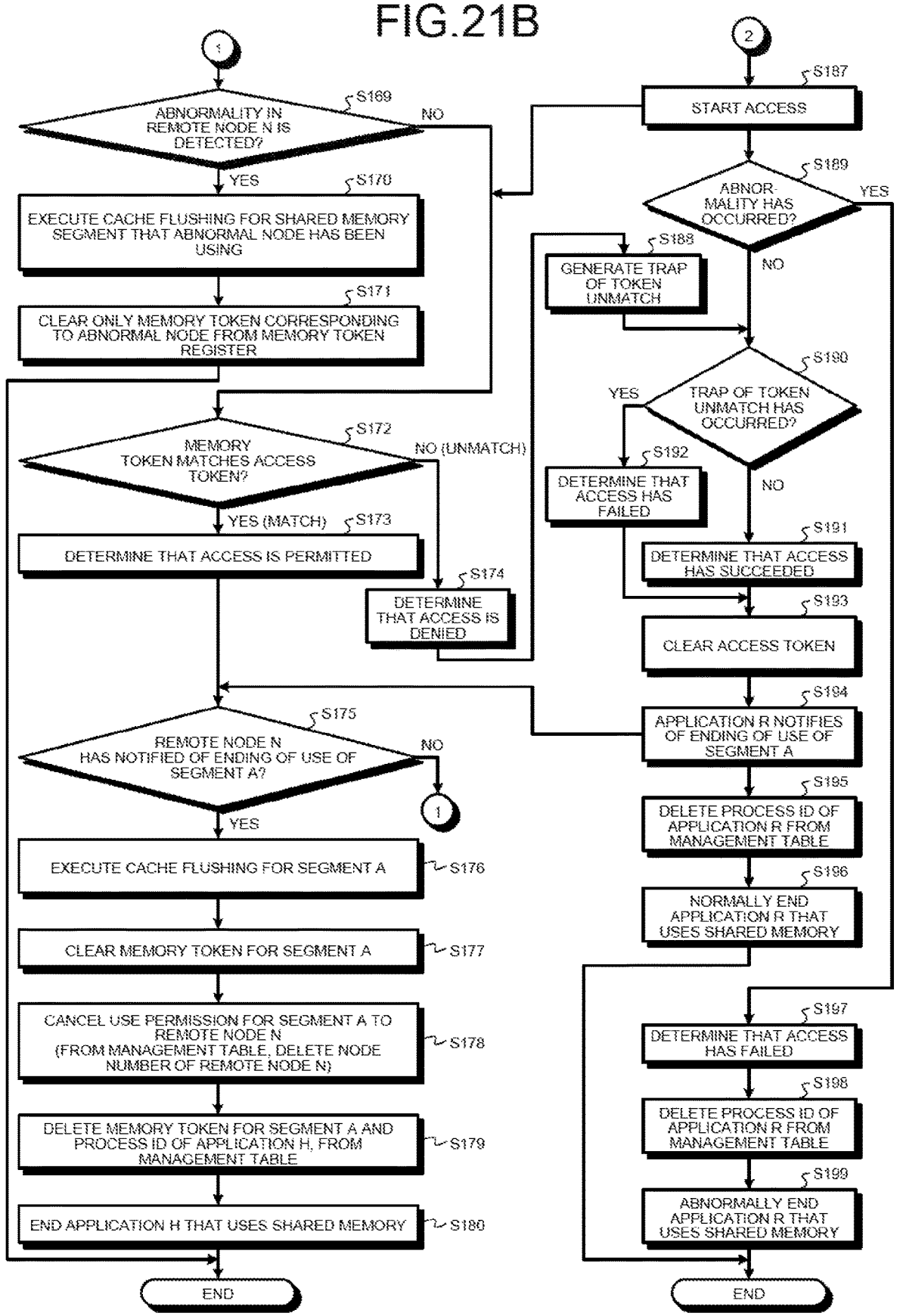
FIG. 21B is a second flowchart illustrating the flow of the process for using the shared memory.

Next, flows of processes for using the shared memory 43 will be described. FIG. 21A is a first flowchart illustrating a flow of a process for using the shared memory 43, and FIG. 21B is a second flowchart illustrating a flow of a process for using the shared memory 43. As illustrated in FIG. 21A, on a home node, the OS 60 starts an application H, which is an application that uses the shared memory 43 (Step S161). The application H then gets a segment A of the shared memory 43 (Step S162). The node and process managing unit 71 of the home node then adds the process ID of the application H, which uses the segment A, to the management table 70 (Step S163).

Thereafter, the home node permits the remote node N to use the segment A of the shared memory 43, and notifies the remote node N of the use permission for the segment A (Step S164). The node and process managing unit 71 of the home node then adds the node number of the remote node N, which uses the segment A, to the management table 70.

On the remote node N, the OS 60 starts an application R that uses the shared memory 43 (Step S181). The shared memory managing unit 61 of the remote node N attaches the segment A to the application R when the shared memory managing unit 61 is notified by the home node of the use permission for the segment A (Step S182). Further, the node and process managing unit 71 of the remote node N adds the process ID of the application R, which uses the segment A, to the management table 70 (Step S183).

The home node then sets, in the memory token register 27a for the segment A, a memory token different for each node (Step S165), and notifies each remote node of the different memory token for the segment A (Step S166). The home node then notifies the OS 60 of the memory token for the segment A (Step S167), and the OS 60 adds the memory token for the segment A to the management table 70 (Step S168).

When the home node notifies the application R on the remote node N of the memory token for the segment A, the application R notifies the OS 60 of the memory token for the segment A (Step S184). The shared memory managing unit 61 of the remote node N adds the access token of the segment A to the management table 70 (Step S185), and sets the access token in the access token register 28 (Step S186).

As illustrated in FIG. 21B, the application R on the remote node N then starts access to the segment A (Step S187).

Thereafter, if the home node detects an abnormality in the remote node N (Step S169; Yes), the cache flushing unit 74 executes cache flushing for the shared memory segment that the abnormal node has been using (Step S170). The memory token setting canceling unit 75a then clears only a memory token corresponding to the abnormal node from the memory token register 27a, for the shared memory segment that the abnormal node has been using (Step S171).

If an abnormality in the remote node N is not detected (Step S169; No) and the home node receives access to the segment A, the checking unit 29 of the home node determines whether or not the memory token for the segment A matches the access token (Step S172) and if they match, determines that the access is permitted (Step S173). On the contrary, if they do not match, the checking unit 29 determines that the access is denied (Step S174), and notifies the remote node N of the access denial. When the remote node N is notified of the access denial, the remote node N generates a trap of token unmatch (Step S188) and proceeds to Step S190.

If an abnormality has not occurred after the start of the access to the segment A (Step S189; No), the remote node N determines whether or not a trap of token unmatch has occurred (Step S190). As a result, if the trap has not occurred, the remote node N determines that the access has succeeded (Step S191), and if the trap has occurred, the remote node N determines that the access has failed (Step S192). Thereafter, the remote node N clears the access token (Step S193) and the application R notifies that the use of the segment A has ended (Step S194).

The home node determines whether or not the remote node N has notified the home node of ending of the use of the segment A (Step S175), and returns to Step S169 if there has been no notification. On the contrary, if there has been the notification, the cache flushing unit 74 executes cache flushing for the segment A (Step S176).

The home node then clears the memory token for the segment A (Step S177), and the node and process managing unit 71 cancels the use permission for the segment A to the remote node N (Step S178). That is, the node and process managing unit 71 deletes the node number of the remote node N from the management table 70.

The node and process managing unit 71 then deletes the memory token of the segment A and the process ID of the application H from the management table 70 (Step S179). The home node then ends the application H that uses the shared memory 43 (Step S180).

The node and process managing unit 71 of the remote node N deletes the access token for the segment A and the process ID of the application R from the management table 70 (Step S195). The remote node N then normally ends the application R that uses the shared memory 43 (Step S196).

Further, if an abnormality has occurred (Step S189; Yes), the remote node N determines that the access has failed (Step S197), and the node and process managing unit 71 deletes the access token for the segment A and the process ID of the application R from the management table 70 (Step S198). The remote node N then abnormally ends the application R that uses the shared memory 43 (Step S199).

As described above, when an abnormality occurs in the remote node N, the memory token setting canceling unit 75a cancels only the setting of a memory token corresponding to the abnormal node, the memory token from the memory token register 27a. Therefore, the home node is able to prevent access to the segment A from the remote node N, in which an abnormality has occurred.

Next, a flow of a process upon occurrence of an abnormality in a node will be described. FIG. 22 is a flowchart illustrating the flow of the process upon occurrence of an abnormality in a node. As illustrated in FIG. 22, the memory token setting unit 72a of the home node sets a memory token different for each node to the memory token register 27a, for a shared memory segment that remote nodes use (Step S201). The memory token setting unit 72a then notifies the remote nodes of the tokens (Step S202).

The remote nodes notified of the tokens set access tokens (Step S203 and Step S204) and start access to the shared memory segment (Step S205 and Step S206). If an abnormality then occurs in one of the remote nodes (Step S207), the home node detects the abnormality in that remote node (Step S208).

The cache flushing unit 74 then executes cache flushing for the shared memory segment that the abnormal node has been using (Step S209). The memory token setting canceling unit 75a then clears a memory token corresponding to the abnormal node from the memory token register 27a, for the shared memory segment that the abnormal node has been using (Step S210).

Thereafter, when the remote node, in which the abnormality has occurred, attempts to access the shared memory segment, the access fails (Step S211) and the processing ends abnormally (Step S212). Further, when a normal remote node attempts to access the shared memory segment, the access succeeds (Step S213). Thereafter, when the normal remote node ends the use of the shared memory segment, the access token is cleared (Step S214), and the processing ends normally (Step S215).

As described above, the memory token setting canceling unit 75a cancels only the setting of a memory token corresponding to the abnormal node, the memory token from the memory token register 27a, for the shared memory segment that the abnormal node has been using. Therefore, the home node is able to instantly block only the access from the abnormal node.

Figure 23:
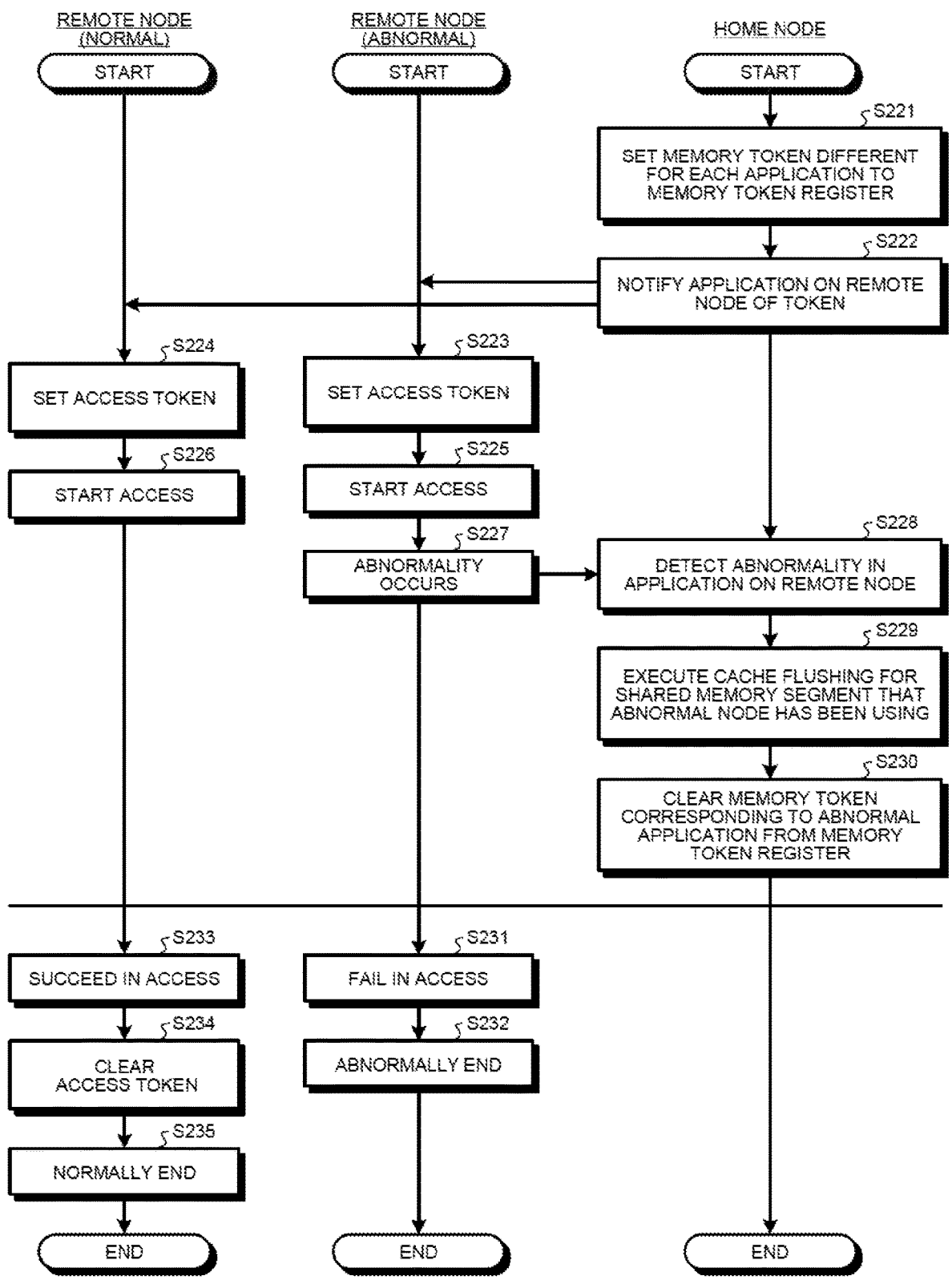
FIG. 23 is a flowchart illustrating a flow of a process upon occurrence of an abnormality in an application.

Next, a flow of a process upon occurrence of an abnormality in an application will be described. FIG. 23 is a flowchart illustrating the flow of the process upon occurrence of an abnormality in an application. As illustrated in FIG. 23, the memory token setting unit 72a of the home node sets a memory token different for each application to the memory token register 27a, for a shared memory segment that applications running on remote nodes use (Step S221). The memory token setting unit 72a then notifies the applications on the remote nodes of the tokens (Step S222).

The remote node applications notified of the tokens set access tokens (Step S223 and Step S224) and start access to the shared memory segment (Step S225 and Step S226). If an abnormality then occurs in an application running on one of the remote nodes (Step S227), the home node detects the abnormality in that remote node (Step S228).

The cache flushing unit 74 then executes cache flushing for the shared memory segment that the abnormal application has been using (Step S229). The memory token setting canceling unit 75a then clears a memory token corresponding to the abnormal node from the memory token register 27a, for the shared memory segment that the abnormal application has been using (Step S230).

Thereafter, when the application, in which the abnormality has occurred, attempts to access the shared memory segment, the access fails (Step S231) and the processing ends abnormally (Step S232). Further, when a normal application attempts to access the shared memory segment, the access succeeds (Step S233). Thereafter, when the normal application ends the use of the shared memory segment, the access token is cleared (Step S234), and the processing ends normally (Step S235).

As described above, the memory token setting canceling unit 75a cancels only the setting of a memory token corresponding to the abnormal application, the memory token from the memory token register 27a, for the shared memory segment that the abnormal application has been using. Therefore, the home node is able to instantly block only the access from the abnormal application.

As described above, according to the second embodiment, a different memory token for each node or for each application is stored in the memory token register 27a. If an abnormality occurs in any of the nodes 1 or applications, the memory token setting canceling unit 75a cancels only the setting of the memory token corresponding to that abnormal node or abnormal application. Therefore, the home node is able to instantly block only the access from the abnormal node or abnormal application and let the access from a normal node or normal application continue, for the shared memory segment that the abnormal node or abnormal application has been using.

According to an aspect, even if a failure occurs in a certain information processing apparatus or in a certain application, without interruption of access to a shared memory from a normal information processing apparatus or a normal application, access to the shared memory from the abnormal information processing apparatus or abnormal application, in which the failure has occurred, is able to be instantly made blockable.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, which forms, together with other plural information processing apparatuses, an information processing system, and has a shared memory accessed by the other plural information processing apparatuses, the shared memory being a part of a main memory of the information processing apparatus, the information processing apparatus comprising:
    a memory token register that stores therein, for each unit area of the shared memory, a memory token that is used as a memory key;
    a permission setting register that includes, for each unit area of the shared memory, a plurality of bits each of which is used in control of access permission from a corresponding information processing apparatus or a corresponding processing device included in each information processing apparatus;
    a setting processor that updates, for each unit area of the shared memory that each corresponding information processing apparatus or each corresponding processing device uses, the permission setting register to be permitted and sets, when an abnormality occurs in an abnormal information processing apparatus, which is any one of the other plural information processing apparatuses, after starting access to a unit area of the shared memory, for a unit area of the shared memory, the unit area that the abnormal information processing apparatus has been using, a bit of the permission setting register, the bit corresponding to the abnormal information processing apparatus or corresponding to the processing device included in the abnormal information processing apparatus, to indicate "not permitted" while a bit of the permission setting register, the bit corresponding to a normal information processing apparatus or a processing device included in the normal information processing apparatus, remains unchanged; and
    a determining processor that:
        determines, based on a corresponding bit of the permission setting register, when any of the other plural information processing apparatuses or a processing device included in any of the other plural information processing apparatuses attempts to access any of the unit areas of the shared memory via an access request including a memory token, whether access to each of the unit areas requested to be accessed is permitted;
        when the access from that other information processing apparatus or the processing device included in that other information processing apparatus is not permitted, denies the access to the unit area being a target of the determination; and
        when the access from that other information processing apparatus or the processing device included in that other information processing apparatus is permitted, determines whether to permit the access to the unit area being the target of the determination, based on a result of comparing the memory token included in the access request with the memory token stored in the memory token register.

2. The information processing apparatus according to claim 1, further comprising a flushing executing processor that executes, before the setting processor sets the bit of the permission setting register to "not permitted", cache flushing for a unit area of the shared memory, the unit area that the abnormal information processing apparatus has been using.

3. The information processing apparatus according to claim 1, wherein
    the permission setting register includes a bit for each of read access and write access,
    the setting processor sets, for a unit area of the shared memory, the unit area that the abnormal information processing apparatus has been using, a bit corresponding to write access to "not permitted", from the bits corresponding to the abnormal information processing apparatus or each processing device included in the abnormal information processing apparatus,
    the determining processor determines, based on each of bits for read access and write access, whether to permit each of read access and write access, and
    the information processing apparatus further comprises a log output processor that reads data of the unit area of the shared memory, the unit area that the abnormal information processing apparatus has been using, and outputs a log.

4. The information processing apparatus according to claim 1, wherein the processing device is a CPU chip, a core, a strand, a virtual node, or a virtual CPU.

5. The information processing apparatus according to claim 1, wherein the abnormal information processing apparatus is an information processing apparatus having an application running on the information processing apparatus, the application where an abnormality has occurred.

6. The information processing apparatus according to claim 1, further comprising a management information storage region that stores therein management information associating a unit area of the shared memory with any information processing apparatus that has received use permission per unit area, wherein the setting processor refers to the management information and identifies the unit area of the shared memory, the unit area that the abnormal information processing apparatus has been using, and sets, for the identified unit area, the bit corresponding to the abnormal information processing apparatus or each processing device included in the abnormal information processing apparatus to "not permitted".

7. The information processing apparatus according to claim 1, wherein the determining processor determines whether the access to each of the unit areas requested to be accessed is permitted after starting access to a unit area of the shared memory;

when the access from that other information processing apparatus or the processing device included in that other information processing apparatus is not permitted after starting access to a unit area of the shared memory, denies the access to the unit area being a target of the determination; and when the access from that other information processing apparatus or the processing device included in that other information processing apparatus is permitted after starting access to a unit area of the shared memory, determines whether to permit the access to the unit area being the target of the determination, based on a result of comparing the memory token included in the access request with the memory token stored in the memory token register.

8. A shared memory management method executed by an information processing apparatus, which forms, together with other plural information processing apparatuses, an information processing system, and which has a shared memory accessed by the other plural information processing apparatuses, the shared memory being a part of a main memory of the information processing apparatus, the information processing apparatus executing:

setting updating information indicating that access is permitted in a permission setting register that includes, for each unit area of the shared memory, a plurality of bits each of which is used in control of access permission from a corresponding information processing apparatus or a corresponding processing device included in each information processing apparatus;

setting, when an abnormality occurs in an abnormal information processing apparatus, which is any one of the other plural information processing apparatuses, after starting access to a unit area of the shared memory, for a unit area of the shared memory, the unit area that the abnormal information processing apparatus has been using, a bit of the permission setting register, the bit corresponding to the abnormal information processing apparatus or corresponding to processing device included in the abnormal information processing apparatus, to indicate "not permitted" while a bit of the permission setting register, the bit corresponding to a normal information processing apparatus or a processing device included in the normal information processing apparatus, remains unchanged; and when any of the other plural information processing apparatuses or a processing device included in any of the other plural information processing apparatuses attempts to access any of the unit areas of the shared memory via an access request including a memory token, determining, based on a corresponding bit of the permission setting register, whether access to each of the unit areas requested to be accessed is permitted;

when access by that other information processing apparatus or the processing device included in the other information processing apparatus is not permitted, denying access to the unit area being a target of the determination; and when access by the other information processing apparatus or the processing device included in the other information processing apparatus is permitted, determining, based on a result of comparing the memory token included in the access request with a memory token used as a memory key for each unit area of the shared memory, whether to permit access to the unit area being the target to be determined.

9. A non-transitory computer-readable recording medium having stored therein a shared memory management program executed by an information processing apparatus, which forms, together with other plural information processing apparatuses, an information processing system, and which has a shared memory accessed by the other plural information processing apparatuses, the shared memory being a part of a main memory of the information processing apparatus, the shared memory management program causing the information processing apparatus to execute:

setting updating information indicating that access is permitted in a permission setting register that includes, for each unit area of the shared memory, a plurality of bits each of which is used in control of access permission from a corresponding information processing apparatus or a corresponding processing device included in each information processing apparatus;

setting, when an abnormality occurs in an abnormal information processing apparatus, which is any one of the other plural information processing apparatuses, after starting access to a unit area of the shared memory, for a unit area of the shared memory, the unit area that the abnormal information processing apparatus has been using, a bit of the permission setting register, the bit corresponding to the abnormal information processing apparatus or corresponding to processing device included in the abnormal information processing apparatus, to indicate "not permitted" while a bit of the permission setting register, the bit corresponding to a normal information processing apparatus or a processing device included in the normal information processing apparatus, remains unchanged; and when any of the other plural information processing apparatuses or a processing device included in any of the other plural information processing apparatuses attempts to access any of the unit areas of the shared memory via an access request including a memory token, determining, based on a corresponding bit of the permission setting register, whether access to each of the unit areas requested to be accessed is permitted;

when access by that other information processing apparatus or the processing device included in the other information processing apparatus is not permitted, denying access to the unit area being a target of the determination; and when access by the other information processing apparatus or the processing device included in the other information processing apparatus is permitted, determining, based on a result of comparing the memory token included in the access request with a memory token used as a memory key for each unit area of the shared memory, whether to permit access to the unit area being the target to be determined.

\* \* \* \* \*